(12) United States Patent
Johnston et al.

(10) Patent No.: US 7,835,110 B2
(45) Date of Patent: Nov. 16, 2010

(54) MEMS DISC DRIVE

(75) Inventors: Alan Johnston, Londonderry (IE);
Roger Hipwell, Eden Prairie, MN (US);
Hans Leuthold, Santa Cruz, CA (US);
Song S. Xue, Edina, MN (US); Nurul Amin, Woodbury, MN (US); Andrew White, Minneapolis, MN (US); Patrick Ryan, Saint Paul, MN (US); Bradley Ver Meer, Savage, MN (US); John Pendray, Cambridge, MA (US); Steven Kalderon, Minneapolis, MN (US); Wayne Bonin, North Oak, MN (US); Jeffery Berkowitz, Carver, MN (US)

(73) Assignee: Seagate Technology, Scotts Valley, CA (US)

( * ) Notice: Subject to any disclaimer, the term of this patent is extended or adjusted under 35 U.S.C. 154(b) by 800 days.

(21) Appl. No.: 11/656,692

(22) Filed: Jan. 23, 2007

(65) Prior Publication Data

US 2008/0174907 A1    Jul. 24, 2008

(51) Int. Cl.
*G11B 5/105* (2006.01)
(52) U.S. Cl. .................................. 360/97.01
(58) Field of Classification Search ............... 360/97.01
See application file for complete search history.

(56) References Cited

U.S. PATENT DOCUMENTS

| | | | |
|---|---|---|---|
| 5,025,346 A | 6/1991 | Tang et al. | |
| 5,101,669 A | 4/1992 | Holm-Kennedy | |
| 5,710,678 A | 1/1998 | Leuthold et al. | |
| 5,856,895 A | 1/1999 | Schaenzer | |
| 6,079,088 A | 6/2000 | Schaenzer | |
| 6,318,176 B1 | 11/2001 | McKenzie | |
| 6,430,001 B1 | 8/2002 | Chainer et al. | |
| 6,499,881 B2 | 12/2002 | Boutaghou et al. | |
| 6,507,463 B1 | 1/2003 | Boutaghou | |
| 6,611,399 B1 | 8/2003 | Mei et al. | |
| 6,629,448 B1 | 10/2003 | Cvancara | |
| 6,655,002 B1 | 12/2003 | Maimone et al. | |
| 6,683,757 B1 | 1/2004 | Bonin et al. | |
| 6,731,465 B2 | 5/2004 | Crane et al. | |
| 6,757,140 B1 * | 6/2004 | Hawwa ................... 360/294.5 |
| 6,832,383 B2 | 12/2004 | Holmberg et al. | |
| 6,865,044 B1 | 3/2005 | Albrecht et al. | |
| 6,882,488 B1 | 4/2005 | Albrecht et al. | |

(Continued)

FOREIGN PATENT DOCUMENTS

WO    WO 01/27638 A1    4/2001

OTHER PUBLICATIONS

U.S. Appl. No. 11/656,714, Hipwell, Roger.

(Continued)

*Primary Examiner*—Mark Blouin
(74) *Attorney, Agent, or Firm*—Mikel R. Boeve

(57) ABSTRACT

A micro-electromechanical systems (MEMS) disc drive includes high-precision and integrated components to allow for increased functionality, robustness and reduced size as compared to currently produced disc drives. Integrating multiple subcomponents of the disc drive using batch processing provides low manufacturing costs. Furthermore, using MEMS techniques, new features can be added to disc drives. For example, an environmental control component, an accelerometer and/or a thermometer may be integrated into the housing of the disc drive.

27 Claims, 24 Drawing Sheets

U.S. PATENT DOCUMENTS

| | | | |
|---|---|---|---|
| 6,906,879 | B1 | 6/2005 | Albrecht et al. |
| 7,077,010 | B2 | 7/2006 | Ganapathi |
| 7,480,981 | B2 * | 1/2009 | Takada et al. ............ 29/603.04 |
| 2003/0030527 | A1 | 2/2003 | Mhani |
| 2004/0119354 | A1 | 6/2004 | Takada et al. |
| 2005/0006227 | A1 | 1/2005 | Hao et al. |
| 2005/0145029 | A1 | 7/2005 | Stewart |

OTHER PUBLICATIONS

U.S. Appl. No. 11/656,659, Johnston, Alan.
U.S. Appl. No. 11/656,919, White, Andrew D.
U.S. Appl. No. 11/656,811, Hipwell, Roger.
U.S. Appl. No. 11/348,930, Xue et. al.
Product Brochure for The Bearing Solution, Bearing Co., Inc., 5 pages, printed Apr. 17, 2006.
Product Brochure for Technical Data, Bearing Co., Inc., 8 pages, printed Apr. 17, 2006.
www.incabloc.ch/incablocANG.html, 1 page, accessed on Apr. 17, 2006.
www.dbanks.demon.co.uk/ueng/; Home Page; Retrieved on Dec. 12, 2006; 1 page.
Wang, Li-Peng; Wolf, Richard; Wang, Yu; Deng, Ken; Zou, Lichen; Davis, Robert; Trolier-McKinstry, Susan; Design, Fabrication, and Measurement of High-Sensitivity . . . Piezoelectric Microelectromechanical Systems Accelerometers; Journal of Microelectromechanical Systems; Aug. 2003, p. 433-439, vol. 12, No. 4.
U.S. Appl. No. 11/747,723.
U.S. Appl. No. 11/656,714.
U.S. Appl. No. 11/656,659.
U.S. Appl. No. 11/656,811.

* cited by examiner (VI)

(VII)

(VIII)

(IX)

MEMS DISC DRIVE

TECHNICAL FIELD

The invention relates to disc drives.

BACKGROUND

A disc drive typically includes a base to which various drive components are mounted. A cover connects with the base to form a housing that defines an internal, sealed environment. The components include a spindle motor, which rotates one or more discs at a constant high speed. Information is written to and read from tracks on the discs through the use of an actuator assembly. The actuator assembly includes one or more actuator arms, which extend towards the discs. Mounted on each of the actuator arms is a head, which includes one or more transducer elements to perform read operations, write operations or read and write operations. Heads generally include an air bearing slider enabling the head to fly in close proximity above the corresponding media surface of the associated disc. An air bearing slider does not necessarily need air to operate. For example, in some designs, the internal environment of a disc drive may be filled with a fluid other than air, e.g., helium.

Increases in storage media density have allowed disc drive manufactures to produce disc drives with large capacities, but which are much smaller than disc drives generally found in desktop computers. For example, a five gigabyte disc drive having a smaller profile than a credit card, and a thickness less than a quarter-inch is currently available. Small disc drives are scaled versions of what has been developed for larger versions.

However, smaller disc drive designs create new challenges. Current disc drive designs have begun to reach the limits of conventional manufacturing techniques. Smaller disc drives developed for consumer electronics, e.g., cell phones and PDAs, must withstand higher shocks than desktop or laptop computer disc drives. Manufacturing tolerances of the mechanical components of a disc drive are relatively crude in small form factor drives. For this reason, physical stops, e.g., gimbal limiters, used in conventional disc drives to prevent the actuator assembly from contacting the media surface are only effective for large displacement shocks. In another example, the minimum thickness of a disc drive can be limited because suitable rotary bearings for the actuator assembly become difficult to manufacture for disc drive design with a small height, e.g., a height of less than 3.5 millimeters (0.14 inches). Also, manufacturing tolerances for disc drive designs force the gap between the permanent magnet and the voice coil of the actuator assembly to be at least about 25 micrometers. A smaller gap would be preferred to provide greater force, require less energy to move the actuator assembly, and/or use a smaller actuation mechanism, which generally includes a permanent magnet and voice coil. These and other challenges must be met to develop even smaller disc drive designs.

In a separate development, micro-electromechanical systems (MEMS) microstructures are manufactured in batch methodologies similar to computer microchips. The photolithographic techniques that mass-produce millions of complex microchips can also be used simultaneously to develop and produce mechanical sensors and actuators integrated with electronic circuitry. Most MEMS devices are built on wafers of silicon, but other substrates may also be used. MEMS manufacturing processes adopt micromachining technologies from integrated circuit (IC) manufacturing and batch fabrication techniques.

Like ICs, the structures are developed in thin films of materials. The processes are based on depositing thin films of metal, insulating material, semiconducting material or crystalline material on a substrate, applying patterned masks by photolithographic imaging, and then etching the films to the mask. In addition to standard IC fabrication methods, in MEMS manufacturing a sacrificial layer is introduced—a material which keeps other layers separated as the structure is being built up but is dissolved in the very last step leaving selective parts of the structure free to move.

Use of established "batch" processing of MEMS devices, similar to volume IC manufacturing processes, eliminates many of the cost barriers that inhibit large scale production using other less proven technologies. Although MEMS fabrication may consist of a multi-step process, the simultaneous manufacture of large numbers of these devices on a single wafer can greatly reduce the overall per unit cost.

Surface micromachining, bulk micromachining and electroforming (lithography, plating and molding) constitute three general approaches to MEMS manufacturing. Surface micromachining is a process based on the building up of material layers that are selectively preserved or removed by continued processing. The bulk of the substrate remains untouched In contrast, in bulk micromachining, large portions of the substrate are removed to form the desired structure out of the substrate itself. Structures with greater heights may be formed because thicker substrates can be used for bulk micromachining as compared to surface micromachining.

Electroforming processes combine IC lithography, electroplating and molding to obtain depth. Patterns are created on a substrate and then electroplated to create three-dimensional molds. These molds can be used as the final product, or various materials can be injected into them. This process has two advantages. Materials other than the wafer material, generally silicon, can be used (e.g. metal, plastic, ceramic) and devices with very high aspect ratios can be built. Electroforming can also be a cost-effective method of manufacturing due to, e.g., relatively inexpensive processing equipment.

Another fabrication technique is wafer bonding. Wafer bonding can be used to bond micromachined silicon wafers together, or to other substrates, to form larger more complex devices. Examples of wafer bonding include anodic bonding, metal eutectic bonding and direct silicon bonding. Other bonding methods include using an adhesive layer, such as a glass, or photoresist.

MEMS fabrication processes usually include deposition, etching and lithography. These processes are repeated in according to an ordered sequence to produce the layers and features necessary for the MEMS structure. Deposition refers to the deposit of thin films of material and includes depositions from chemical reactions and depositions from physical reaction. Depositions from chemical reactions include chemical vapor deposition, electrodeposition, epitaxy, and thermal oxidation. These processes use solid material created directly from a chemical reaction in gas/or liquid compositions or with the substrate material. Generally, the chemical reaction will also produce one or more byproducts, which may be gases, liquids and even other solids. Depositions from physical reactions include physical vapor deposition (e.g., evaporation or sputtering) and casting. In depositions from physical reactions a deposited material is physically placed on the substrate without creating a chemical byproduct.

Etching is a process of removing portions of deposited films or the substrate itself. Two types of etching processes are wet etching and dry etching. Wet etching dissolves the material by immersing it in a chemical solution. Dry etching occurs by dissolving the material using reactive ions or a vapor phase etchant.

Lithography in the MEMS context is typically the transfer of a pattern to a photosensitive material by selective exposure to a radiation source such as light. When a photosensitive material is selectively exposed to radiation, e.g. by masking some of the radiation, the radiation pattern on the material is transferred to the material exposed. In this manner, the properties of the exposed and unexposed regions differ.

Deposition, etching and lithography processes may occur in combination repeatedly in order to produce a single MEMS structure. Lithography may be used to mask portions of a film or the substrate. Masked portions may be protected during a subsequent etching process to produce precise MEMS structures. Conversely, masked portions may themselves be etched. This process can be used to make a component or a mold for a component. For example, multiple layers of film can be deposited onto a substrate. Following each deposition step, a lithography step may be preformed to define a desired cross section of a MEMS structure through that layer. After a desired number of layers have been deposited and individually subjected to radiation patterns in lithography steps, portions of the layers defining the MEMS structure can be removed with a single etching process, leaving a mold behind for the desired MEMS structure. A compatible material may then be injected into the mold to produce the desired MEMS structure. As shown by this example, precise and complex structures may be produced using MEMS techniques.

SUMMARY

In general, the invention is directed to disc drives that may be manufactured using MEMS techniques. According to one aspect of the invention, integrated components of a disc drive are manufactured using MEMS processes. For example, a complete disc drive may require processing one or more wafers. For example, one wafer may include a base, disc and actuator and another wafer may include a cover having an integrated environmental control component and integrated permanent magnet. In this example, after the two wafers are separately processed, the cover is bonded and sealed to the base to complete the disc drive manufacturing process. Furthermore, a wafer may contain integrated components for multiple disc drives. Including components for multiple disc drives on a single wafer provides reduced costs. In one embodiment, the invention is directed to a device comprising a housing, a rotatable media disc and an actuator including a head to communicate with the rotatable media disc. The housing, the rotatable media disc, the head and the actuator are manufactured from a single wafer substrate.

In a different embodiment, the invention is directed to a device comprising a housing including a base and a cover, a MEMS rotatable media disc, and a MEMS actuator including a head to communicate with the rotatable media disc. The MEMS actuator is bonded to the base or the cover.

In another embodiment, a device comprises a rotatable media disc, and a housing including a base. The rotatable media disc and the base form an integrated disc motor to rotate the rotatable media disc. The base and the rotatable media disc are manufactured as a single component from a single wafer substrate.

Embodiments of the invention may provide one or more of the following advantages. For example, MEMS techniques allow integrated circuits to be integrated with structural components of a HDD. Furthermore, MEMS techniques may provide significantly reduced design tolerance requirements compared to disc drive designs using convention techniques. Furthermore, batch fabrication techniques similar to those used for integrated circuits applied to disc drives can reduce manufacturing costs, allow for complex integrated component designs and reduce require design tolerances as compared to conventional disc drive manufacturing techniques.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
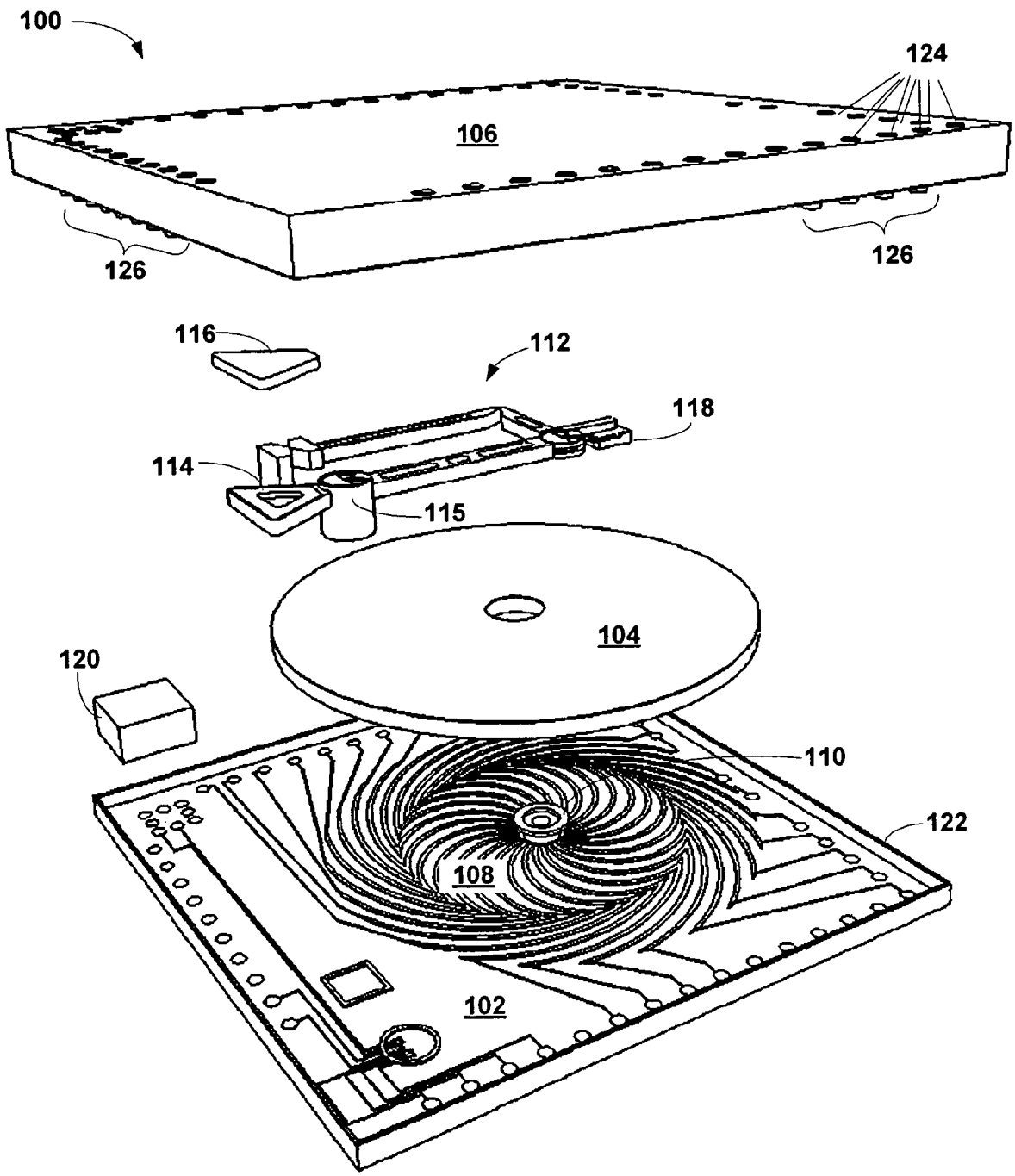
FIGS. 1A-C illustrate a disc dive manufactured using MEMS techniques.
Figure 1B:
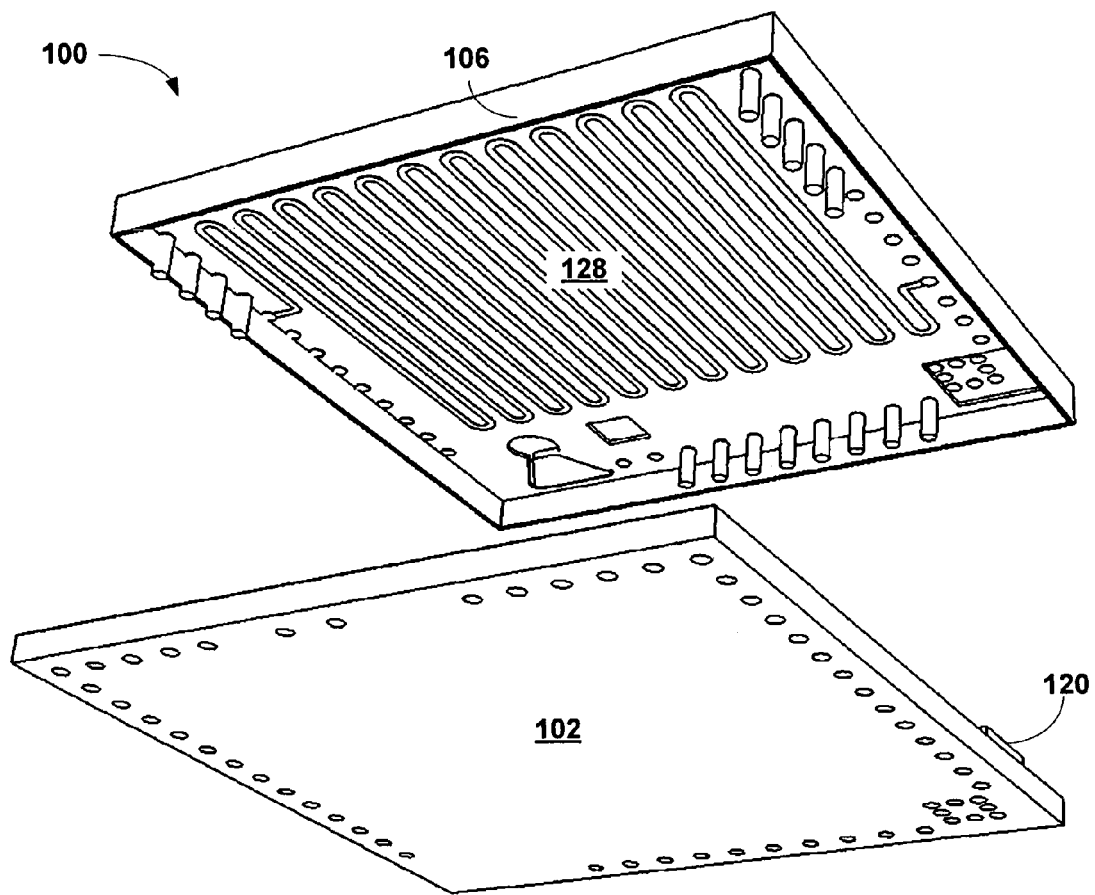
Figure 1C:
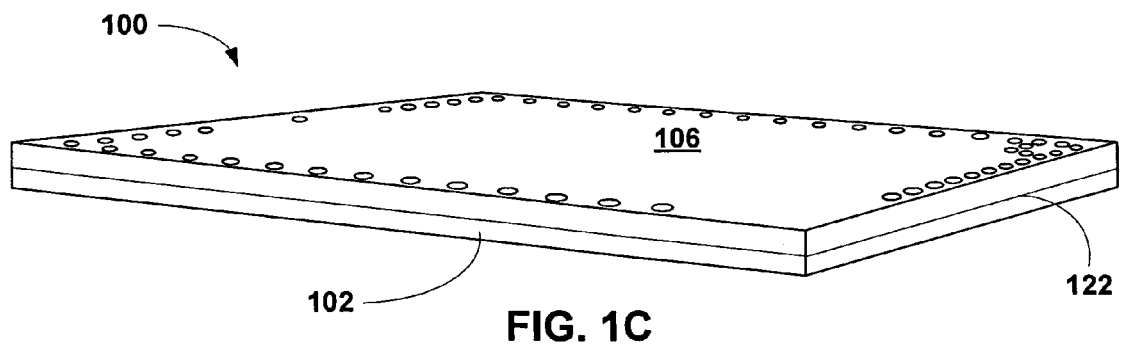

FIGS. 1A-1C illustrate disc dive 100 manufactured using MEMS techniques. FIGS. 1A and 1B are exploded peripheral views of disc drive assembly 100. FIG. 1C shows a disc drive 100 as manufactured. Various components of disc drive assembly 100 are manufactured using MEMS fabrication techniques. Generally speaking, MEMS is the integration of mechanical elements, sensors, actuators, and/or electronics on a substrate using microfabrication technology. The term "substrate" is used generically used throughout this document. For example, the term substrate is synonymous for terms such as sheet, wafer, film, platen, platform, plate and base as commonly used by those of skill in the art.

As an example, the substrate may be silicon commonly used to make integrated circuits (ICs). MEMS components of disc drive assembly 100 are fabricated using microfabrication process sequences. Micromechanical components, e.g., actuator assembly 112, are fabricated using compatible "micromachining" processes that selectively etch away parts of the silicon wafer or add new structural layers to form the mechanical and electromechanical devices. Micromachining techniques include deposition, etching lithographic and electroplating techniques.

Disc drive assembly 100 includes a base 102, disc 104 and cover 106. Disc drive 100 also includes a seal 122 between cover 106 and base 102 to prevent external contaminants from entering an internal environment of disc drive 100 through a seam formed between cover 106 and base 102. Seal 122 also allows disc drive to contain a fluid. For example, in some embodiments the internal environment may hold helium, or in other embodiments a liquid. For example, an internal environment holding a liquid may be useful to provide a boundary layer between moving parts of disc drive assembly 100.

Electronics 120 and actuator assembly 112 are mounted to base 102. Base 102 also includes integrated disc actuator electrodes 108. Electrodes 108 interact with elements integrated into disc 104 to rotate disc 104 about bearing 110 electrostatically. Actuator assembly 112 includes head 118 to read and/or write or data from disc 104. Actuator assembly 112 also includes coil 114, e.g., coil 114 may be a voice coil, which interacts with permanent magnet 116 to actuate actuator assembly 112 to place head 118 in a desired position relative to disc 104. Other embodiments use other actuation methods such as electromagnetic actuation. Integrated components of base 102 may be created using microfabrication processes performed on a single substrate wafer. In some embodiments, microfabrication processes may be used to form more than one of bases 102 on a single wafer.

Like base 102, cover 106 may include integrated components manufactured using a batch fabrication process, which may provide manufacturability, cost, and/or performance improvements. For example, permanent magnet 116 may be integrated with cover 106. As shown if FIG. 1B, cover 106 includes an integrated environmental control component 128. Integrated environmental control component 128 may be a resistive element to heat disc drive 100 and/or a cooler, e.g., Peltier cooling system. Integrated environmental control component 128 provides a controlled environment for disc drive 100.

Figure 2:
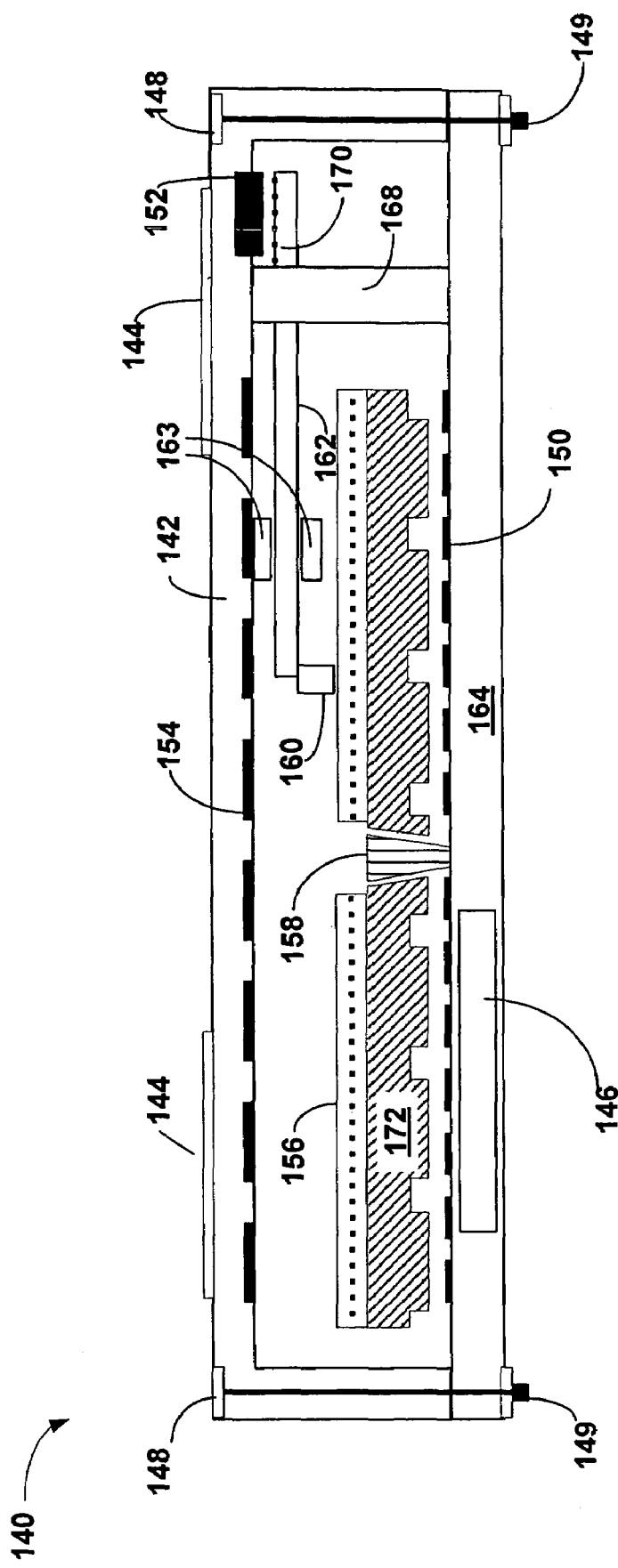
FIG. 2 is a cut-away illustration of a disc dive manufactured using MEMS techniques.

In other embodiments, as shown in FIG. 2, disc drive 100 may also include integrated sensors, such as a thermometer, gyroscope, position sensor, pressure sensor, or accelerometer. Such sensors may be used independently or in conjunction with integrated environmental control component 128. Sensors and/or integrated environmental control component 128 can allow disc drive 100 to respond to changing environmental conditions and/or to shocks and other events. This may increase reliability of disc drive 100, expand allowable operating conditions and/or control the effect of thermal expansion on components of disc drive 100.

As shown in FIG. 1A, cover 106 also includes vias 124, which provide connections between multiple disc drive 100s arranged in a stack or an array. For example, as shown in FIG. 1A vias 124 connect to electrodes 108. With these connections, electrodes 108 may be activated simultaneously to rotate disc 104 with actuation electrodes 108 in one or more other disc drives 100. Vias 124 may also connect electronics 120 between multiple disc drives 100. In this manner, a device having only single disc drive interface may control a stack or an array of disc drives. Electrical studs 126 connect base 102 to vias 124 on cover 106. In disc drive 100, not all vias 124 are paired with one of electrical studs 128, in other embodiments may include more or less vias 124 and/or more or less electrical studs 126.

Disc drive 100 may be manufactured according to a variety of micromachining operations. For example, in one embodiment, base 102 including integrated actuator assembly 112, electronics 120 and disc actuator electrodes 108, may be formed on a single wafer. Cover 106 may be formed on a second wafer. Disc 104 may be formed on the same wafer as cover 106 or base 102, or on its own separate wafer. Assembly of the base and disc may occur before etching of sacrificial layers around disc 104 occurs. In some embodiments, each wafer may contain components for more than one disc drive. Also, separate components may be batch fabricated and assembled in a pick-and-place or batch transfer method.

FIG. 2 illustrates an exemplary disc drive 140 manufactured using MEMS techniques. Disc drive 140 includes a base 164 and a cover 142 that form a sealed housing of disc drive 140. Within the housing, integrated actuation electrodes 150 interact with disc 172 to rotate disc 172 about spindle 158. For example, disc 172 may include integrated magnets or electrostatic elements to receive actuation forces from integrated actuation electrodes 150.

Disc 172 includes a media surface 156, which may comprise, for example, magnetic particles. Disc 172 may optionally include a shield layer (not shown in FIG. 2) below media surface 156 to protect media surface 156 from electromagnetic fields cause by actuation electrodes 150 of disc 172. Disc 172 may also combine with base 164 to form a fluid bearing that creates a boundary layer to keep disc 172 from contacting base 164 during operation of disc drive 140. As referred to herein, a fluid bearing includes two surfaces that support a pressurized layer of fluid between the two surfaces to limit or prevent contact between the two surfaces during movement of one surface relative to the other surface. For example, one of the two surfaces may be textured to produce a desirable pressurized boundary layer of fluid between the two surfaces during movement of one surface relative to the other surface. Spindle 158 may also include fluid bearings to prevent disc 172 from contacting spindle 158 during operation of disc drive 140. In this manner, disc 172 is constrained not only by spindle 158, but also by boundary layer fluid pressure forces from fluid bearings. The bearing fluid could be a liquid or a gas.

Actuator arm 162 holds head 160 in close proximity to media surface 156. Head 160 traverses media surface 156 of disc 172 to read from and/or write to media surface 156. For example, actuator arm 162 may actuate head 160 with a stroke of at least 0.5 millimeters. The stroke is the maximum movement distance of head 160 in a plane parallel to media surface 156 provided by the range of motion of actuator arm 162. As other examples, actuator arm 162 may actuate head 160 with a stroke of at least 1 millimeter, with a stroke of at least 3 millimeters, with a stroke of at least 5 millimeters, with a stroke of at least 10 millimeters, with a stroke of at least 15 millimeters, with a stroke of at least 20 millimeters, or with a stroke of at least 25 millimeters.

Coil 170 interacts with magnet 152 to actuate actuator arm 162 about bearing 168. MEMS techniques provide for very precise layer thicknesses such that smaller tolerances need to be taken into account in the design of disc drive 140. For this reason, coil 170 may be located at a distance of less than 25 micrometers from magnet 152. For example, coil 170 may be located at a distance of less than 20 micrometers from magnet 152. As other examples, coil 170 may be located at a distance of less than 15 micrometers from magnet 152, a distance of less than 10 micrometers from magnet 152, or a distance of less than 5 micrometers from magnet 152. In other embodiments, the locations of magnet 152 switched with coil 170 such that magnet 152 is part of actuator arm 162 and coil 170 is fixed to cover 142. In other embodiments, magnet 152 may be replaced a coil that interacts with coil 170. Such embodiments also allow for a gap between the two coils that is as small as the gap between coil 170 and magnet 152.

Disc drive 140 includes many features that would be difficult or even impossible to include in disc drive manufactured using conventional techniques. For example, disc drive 140 includes motion limiters 163. Because MEMS techniques provide for very precise layers, motion limiters 163 are located in close proximity to actuator arm 162. For example, motion limiters 163 may be located at a distance of less than 25 micrometers from actuator arm 162 or a distance of less than 20 micrometers from actuator arm 162. As other examples, motion limiters 163 may be located at a distance of less than 15 micrometers from actuator arm 162, a distance of less than 10 micrometers from actuator arm 162, or a distance of less than 5 micrometers from actuator arm 162.

As another example, disc drive 140 includes an integrated sensor 146. Integrated sensor 146 may be, e.g., a thermometer, gyroscope, position sensor, pressure sensor, humidity sensor or accelerometer. Integrated sensor 146 may measure ambient conditions within the drive which may be useful to, e.g., to control head-disc spacing. As another example, integrated sensor 146 may be used to detect shocks. For example, in the event of a shock, head 160 may be moved away from media surface 156 to prevent damage to media surface 156.

Disc drive 140 also includes an integrated environmental control component 154, which may include one or both of a resistive heating element and/or a Peltier cooling system. Disc drive 140 may also include control circuitry integrated within its housing. In this manner, disc drive 140 does not require a separate printed circuit board to control its operation. However, disc drive 140 may mount to a printed circuit board as part of a larger device, e.g., a cell phone or other consumer electronic device.

Disc drive 140 further includes vias 148 integrated into its housing; vias 148 include an electrically conductive paths 149, which may allow multiple disc drive 140 provide an interface for another disc drive. For example, disc drive 140 may mount to a printed circuit board and another disc drive may mount on top of disc drive 140 using bond pads 144 and communicate with the printed circuit board through electrically conductive paths 149 of vias 148.

Figure 3:
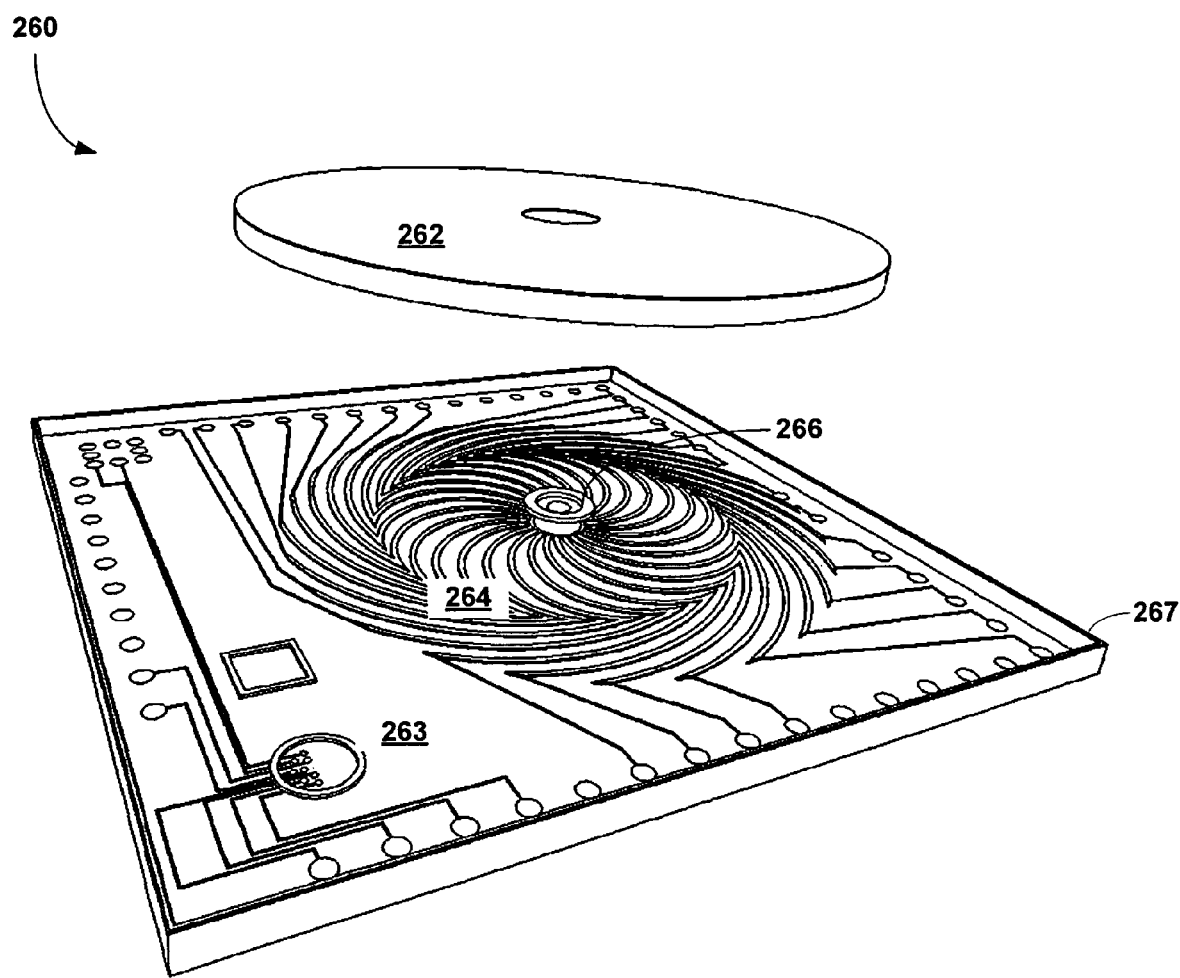
FIG. 3 shows an exploded view of an integrated recordable disc and motor.

FIG. 3 shows an exploded view of integrated recordable disc and motor 260. Integrated disc and motor 260 utilizes ability to pattern conductors, electrodes and/or magnets on or in disc 262 with exceptional precision using MEMS fabrication methods. Integrated disc and motor 260 is shown with disc 262, case 263, center hub 266, actuation electrodes 264 and seal 267. Other configurations of an integrated recordable disc and motor are also possible. For example, center hub 266 may not be required if fluid bearings axially constrain disc 262, e.g., such fluid bearings may be located at the outside diameter of disc 262.

Integrated disc and motor 260 comprises a microfabricated disc actuation mechanism, which may be manufactured utilizing the batch microfabrication processes. Integrated disc and motor 260 may be a component of a small form factor disc drive, e.g., a disc drive having a form factor of one inch or less. Small form factor disc drive designs benefit from small and precise gaps, integrated features or components, and well aligned patterning provided by MEMS techniques. One actuation mechanism that could be implemented into integrated disc and motor 260 is an electrostatic media motor. In the media motor, electrical fields generated by voltages applied to actuation electrodes 264 interact with the bottom surface of disc 262, which is a dielectric material such as glass, inducing charges in the dielectric material of the disc. The induced charges in the disc interact with the electric field from electrodes 264 to generate a force to rotate disc 262. Actuation electrodes 264 also function as a textured fluid bearing surface support disc 262 as it spins. Hub 266 contains the position of disc 262 using fluid and mechanical bearing forces. Optionally, actuation electrodes 264 may provide an electrostatic actuation force on disc 262 to preload fluid bearings during rotation of disc 262. While FIG. 3 shows actuation electrodes acting only one side of disc 262 additional actuation electrodes may placed on both sides of the disc surface.

A similar disc actuation mechanism to an electrostatic media motor is a capacitive electrostatic actuation motor. For a capacitive electrostatic actuation motor, disc 262 includes patterned electrodes on its surface. The location of electrodes on disc 262 may vary. For example electrodes may be positioned at the center of disc 262, throughout the surface of disc 262, only at the outside diameter of disc 262 or otherwise.

For a capacitive electrostatic actuation motor, the electrodes on disc 262 are preferably kept at a set potential (e.g. ground) while actuation electrodes 264 are individually controlled to apply electrostatic attractive forces to rotate disc 262. Voltages to subsets of actuation electrodes 264 are varied with a correctly chosen frequency to provide a constant torque on disc 262.

In another embodiment, integrated disc and motor 260 may combine to form a permanent magnet motor. For example, disc 262 may include integrated permanent magnets and may serve as the rotor for the permanent magnet motor, while actuation electrodes 264 are replaced by electromagnetic coils which function as the stator.

Integrated disc and motor 260 may include additional features not shown in FIG. 3 For example, disc 262 may include multiple layers to optimize actuation output or shield a media surface from a magnetic field created by electromagnetic coils or permanent magnets. Disc 262 and/or actuation electrodes 264 may, in addition to forming part of one or more fluid bearings, also include patterned geometry to optimize actuation output. Instead of, or in combination with fluid bearings, integrated disc and motor 260 may include magnetic layers for magnetic bearings at moving component interfaces. Disc 262 and/or actuation electrodes 264 may also include geometry, e.g., at the outer diameter of disc 262, to enhance shock and disc run-out performance. For example, integrated shock mitigation features may include small-gap limiters or active or passive actuated locking mechanisms, e.g., a piezoelectric "disc clamp", to minimize the effects of shock upon a sensed acceleration event. Described actuation mechanisms are merely exemplary and may be modified consistent with principles of the invention. For example, embodiments may utilize a combination of the described actuation mechanisms.

Figure 4:
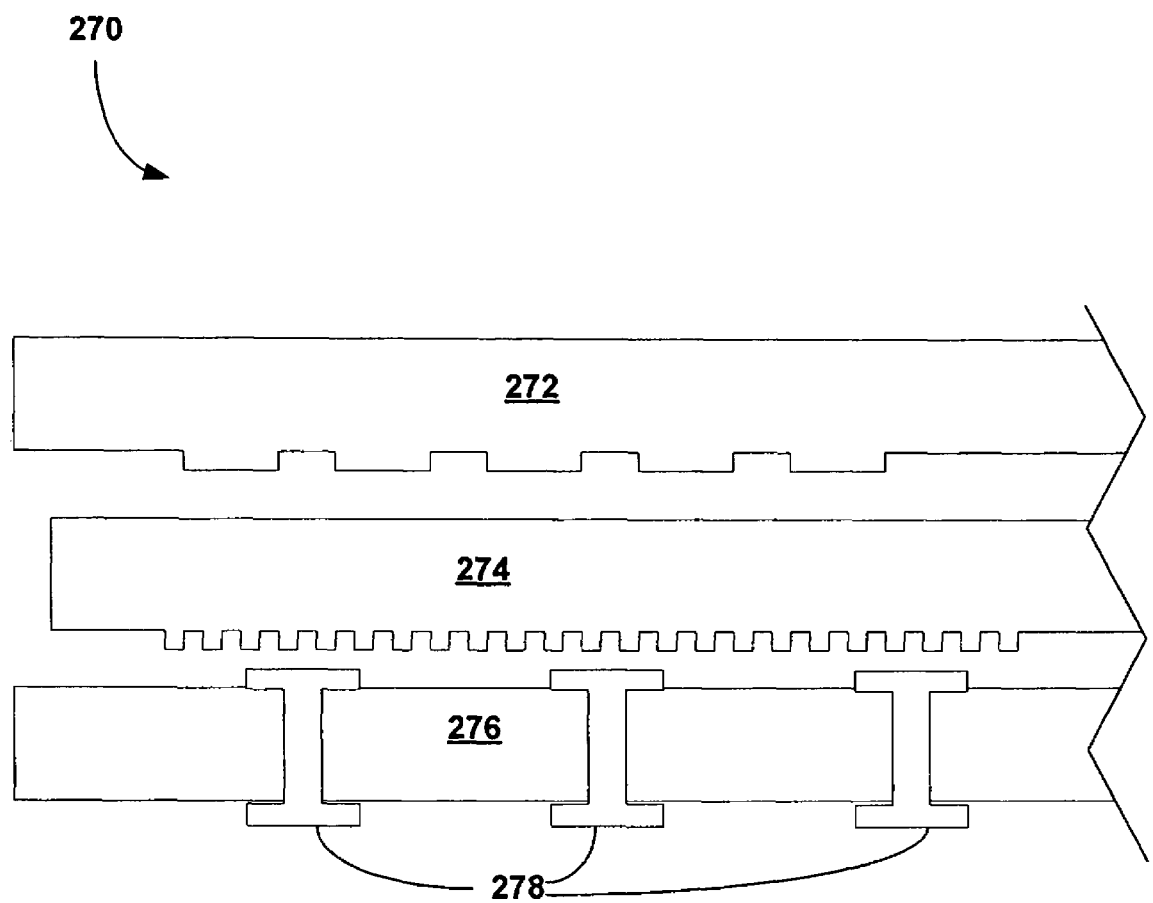
FIG. 4 is a close-up view of an integrated recordable disc and motor.

FIG. 4 is a close-up view of integrated recordable disc and motor 270. Integrated recordable disc and motor 270 includes a disc 274, a base 276 with actuation electrodes 278, and a cover 272. Components of integrated recordable disc and motor 270 may formed using MEMS processes on a single wafer substrate or may be formed on multiple substrates and later assembled, e.g., using pick and place techniques.

Disc 274 includes surface features that optimize actuation forces from actuation electrodes 278; these surface features may also form a textured fluid bearing surface. Actuation electrodes 278 can also form a textured fluid bearing surface, as does cover 272. By providing fluid bearings, integrated recordable disc and motor 270 may achieve a rotational velocity of 100,000 revolutions per minute. As other examples, integrated recordable disc and motor 270 may achieve a rotational velocity of 25,000 revolutions per minute, 50,000 revolutions per minute, and/or 75,000 revolutions per minute. At high rotational velocity, the dynamics of fluid bearings change, which must be incorporated into the design of fluid bearing surfaces on base 276 and cover 272. Additionally, this high rotational velocity allows multiple sampling of the same data from recordable disc 274, which is useful for noise reduction.

MEMS techniques that may be used to produce integrated recordable disc and motor 270 allow for high geometric tolerances. Specifically, integrated recordable disc and motor 270 may be produced using etching among other techniques. Etching techniques include oxidation smoothing of silicon, hydrogen annealing of silicon, controlled atomic layer deposition, and/or start-up burnish.

Figure 5:
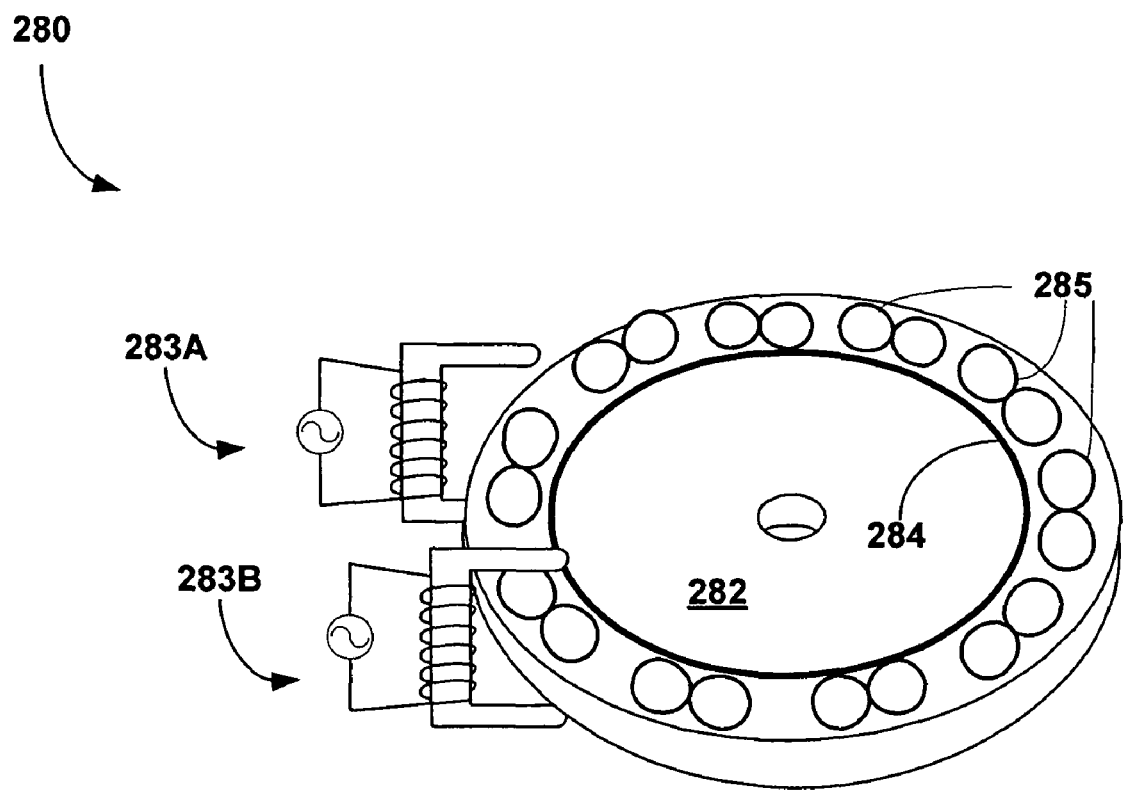
FIG. 5 illustrates an electromagnetic induction actuation mechanism for a recordable disc.

FIG. 5 illustrates electromagnetic induction actuation mechanism 280 for recordable disc 282. Disc 282 includes an integrated shield layer 284 and integrated induction coils 285. Induction coils 285 are shown as figure-eight coils, but other arrangements may also be utilized consistent with principles of the invention. Electromagnetic induction actuation mechanism 280 further includes electromagnets 283A and 283B ("electromagnets 283"), which apply electromagnetic fields to induction coils 285 in order to rotate disc 282. For example, electromagnets 283 may be coils through which current passes to produce a magnetic field. Shield layer 284 may protect a media surface of disc 282 from electromagnetic forces produced by electromagnets 283.

As shown in FIG. 5, induction coils 285 provide torque at the edge of disc 282. Each induction coil 285 has two sides, say side A and side B. A change in magnetic flux through side A, e.g., caused by electromagnet 283A, induces an electromotive force on side A of the loop. This causes a current in the induction coil 285. The same current in side A occurs in side B. The current through loop B creates a magnetic field. Side B of the induction coil 285 can be treated as a magnetic dipole. Electromagnet 283B applies a magnetic field gradient at side B, causing a tangential force at the outside diameter of disc 282. This results in the rotational motion of disc 282.

Figure 6:
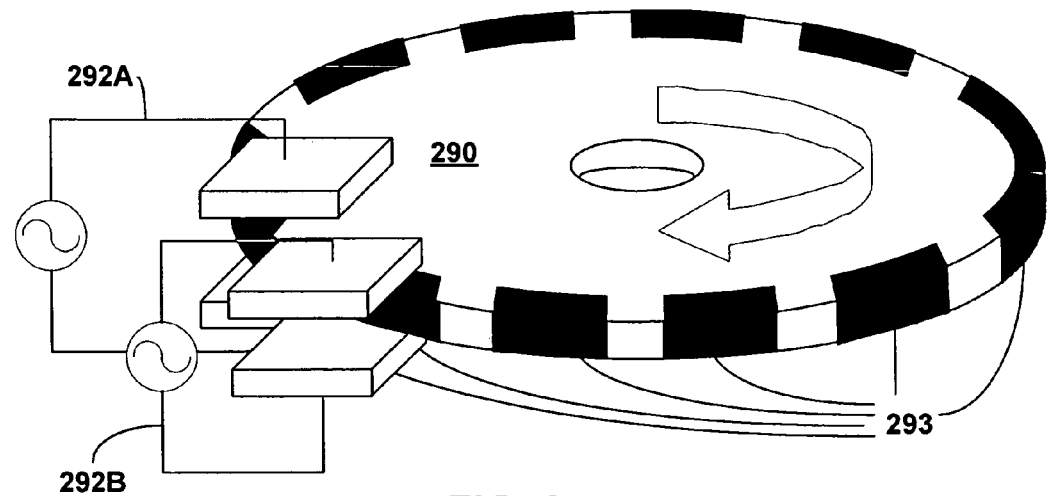
FIG. 6 illustrates an electrostatic actuation mechanism for a recordable disc capable of capacitive disc sensing.

FIG. 6 illustrates capacitive electrostatic actuation mechanism 288 for recordable disc 292 capable of capacitive disc sensing. Capacitive electrostatic actuation mechanism 288 includes capacitors 292A and 292B ("capacitors 292") and recordable disc 292 with integrated conductive plates 293. Plates 293 may be solid elements placed in cavities formed in the disc. In other embodiments, plates 293 may be thin films deposited on the surface, or in shallow recesses in the disc, with the film wrapping around the edge of the disc as shown, to electrically connect the top side plate to the bottom side plate.

The general concept of capacitive electrostatic actuation mechanism 288 is as follows. A voltage applied to one of the capacitors, e.g., capacitor 292A, tends to pull in the nearest conductive plate 293, attempting to center plate 293 under capacitor 292A to create the lowest energy condition. The spacing between plates 293 and capacitors 292A and 292B is selected so that when a plate is directly centered within one capacitor, another plate is not centered, but is offset from the other capacitor. This allows continuous rotation by properly timing the voltage pulses applied to the two capacitors, so that a torque in the desired direction is continuously generated. In practice, the number of capacitors is usually greater than two. The frequency and phase of voltage for capacitor 292A and capacitor 292B may be adjusted to control the rotational velocity of disc 290. This type of actuator does not require the plates on the disc to be grounded for maximum performance.

Figure 7:
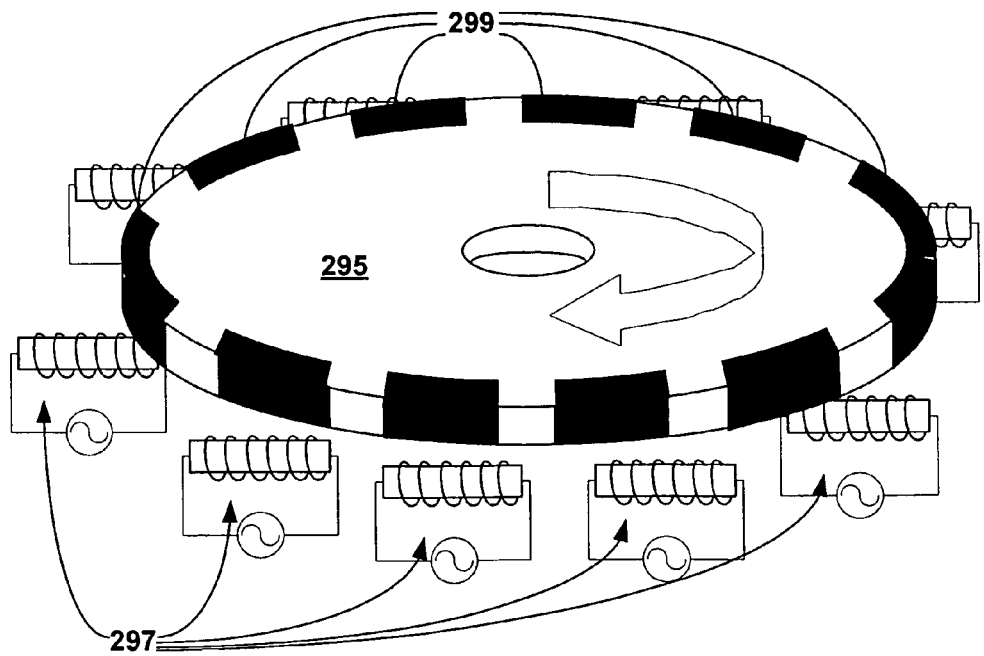
FIG. 7 illustrates an electromagnetic actuation mechanism for a recordable disc.

FIG. 7 illustrates electromagnetic actuation mechanism 294 for recordable disc 295. Magnetic components 299 are integrated about the outer diameter of disc 295. Magnetic components 299 may include a permanently magnetized "hard" magnetic material such as a Samarium-Cobalt alloy, or a high permeability "soft" magnetic material such as permalloy. If magnetic components 299 are permanent magnets, the magnetization direction is preferably radial. The direction of magnetization in each of magnetic components 299 may alternate with each of magnetic components 299 or each of magnetic components 299 may have the same direction of magnetization. Electromagnetic actuation mechanism 294 also includes electromagnets 297, fixed about the outer perimeter of disc 295.

Similar to electromagnetic induction actuation mechanism 280 in FIG. 5 and capacitive electrostatic actuation mechanism 288 in FIG. 6, disc 295 is rotated by a torque at its edges. However, other embodiments may apply a torque at other locations on disc 295. Electromagnets 297 create a magnetic field gradient that reacts with magnetic components 299 integrated with disc 295. For example, an external electric circuit may drive electromagnets 297. Electromagnets 297 may be either single pole or multiple poles. The magnetic field gradient created by electromagnets 297 interacts with the magnetic fields of magnetic components 299 to create a force on disc 295. The rotational velocity of disc 295 can be controlled by the applied currents to electromagnets 297.

Electromagnetic actuation mechanism 294 may be adapted to eliminate a need for a hub or spindle at the center of disc 295. For example, electromagnets 297 may create a centering force on disc 295. Furthermore, fluid bearings may be utilized to further constrain disc 295.

Figure 8A:
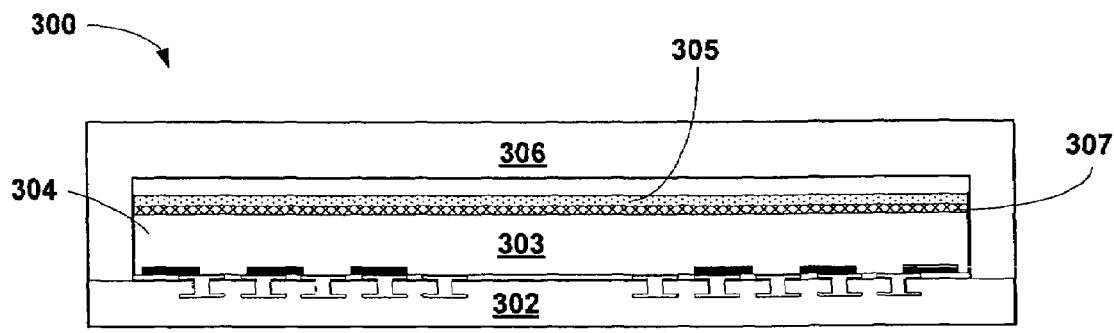
FIGS. 8A-C are cross-section illustrations showing a disc dive including actuator electrodes integrated with the base of the disc drive.
Figure 8B:
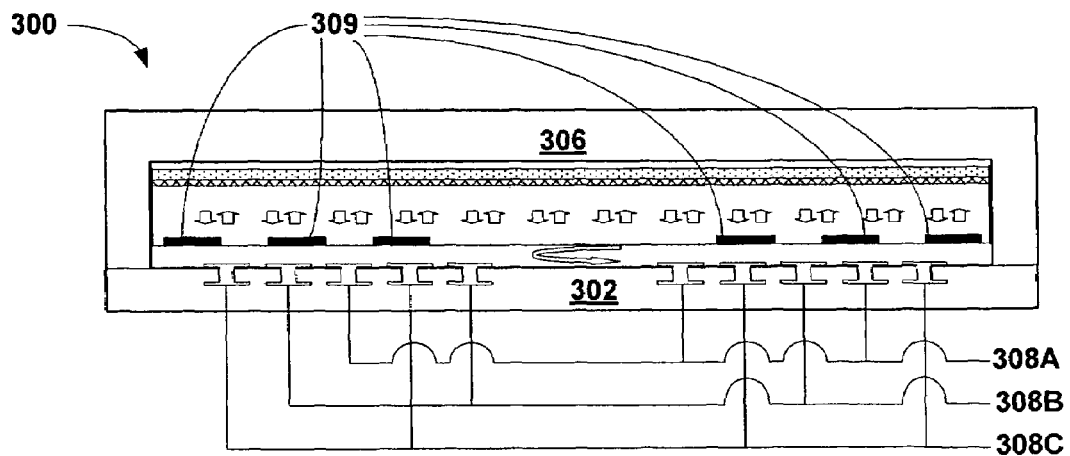

FIGS. 8A-B illustrate disc dive 300 including actuator coils 308A-C (coils 308) integrated within base 302. Base 302 combines with cover 306 to form a housing of disc drive 300. Disc 304 is situated within the housing. Disc drive 300 also includes other components not shown in FIGS. 8A-B. For example, disc drive 300 may contain one or more of the following: electronic components, an actuator assembly including a voice coil, a head and an integrated environmental control component.

Disc 304 is primarily composed of a disc material layer 303, a substrate such as spin-on glass, but also includes a shield layer 307 and a media layer 305. Permanent magnets 309, which are magnetizable components, are integrated with disc 304. Permanent magnets 309 may be evenly spaced on the bottom surface to disc 304 so that the mass of disc 304 is symmetric about its center. Permanent magnets 309 function to harness electromagnetic field energy created by actuator coils 308 in order to rotate disc 304. In some embodiments, disc 304 may not include permanent magnets 309; e.g., permanent magnets 309 may be replaced with a set of coils or coils in conjunction with permanent magnets, or a magnetically soft permeable material may replace the permanent magnets to harness electromagnetic field energy created by actuator coils 308.

Shield layer 307 insulates media layer 305 from electromagnetic fields produced by permanent magnets 309 and/or actuator coils 308. For example, if media layer 305 is a magnetic media layer, shield layer 307 may prevent undesirable degradation to data stored on media layer 305. In other embodiments, media layer 305 may not be affected by electromagnetic fields produced by permanent magnets 309 and/or actuator coils 308 such that layer 307 may not be necessary. For example, media layer 305 may only be affected by electromagnetic fields of much greater strength than those by permanent magnets 309 and/or actuator coils 308.

Actuator coils 308 are arranged in sets, e.g., actuator coil sets 308A-C. For example, actuator coils 308 may rotate disc 304 in the following manner. A current applied to actuator coil 308A attracts the nearest magnet 309 on disc 304. As disc 304 spins and magnet 309 moves past the center of actuator coil 308A, current in actuator coil 308A is turned off and current in actuator coil 308B is turned on, pulling magnet 309 past actuator coil 308A. Once magnets 309 reach actuator coil 308B, current in actuator coil 308B is turned off and current in actuator coil 308C is turned on, pulling magnets 309 towards actuator electrodes 308C. The cycle repeats indefinitely.

Disc 304 rotates within a circular aperture formed by the walls of cover 306. Disc 304 is constrained not only by the physical position of cover 306 and base 302, but also by boundary layers of fluid, e.g., air, around the surfaces of disc 304. Internal surfaces of base 302 and cover 306 may include textured fluid bearing surfaces to increase fluid pressure within boundary layers surrounding disc 304 to stabilize disc 304 as it rotates. At very high speeds, boundary layers fluid pressure surrounding disc 304 may prevent disc from contacting base 302 or cover 306, even when disc drive 300 is subjected to a substantial shock. For example, disc 304 may achieve speeds of 100,000 rpm or greater.

When disc drive 300 is not operating, actuator coils 308 may secure disc to base 302, e.g., the position shown in FIG. 8A. This may protect media surface of disc 304 to increase reliability of disc drive 300. Furthermore, in the event of a severe shock, disc drive 300 may automatically secure disc 304 to base 302 in order to prevent damage to media surface 305. Securing disc 304 to base 302 may temporarily interruption read/write processes of disc drive 300. However, the operation of disc drive 300 may immediately be resumed following a severe shock. The interruption resulting from a shock may not be noticeable to a user of disc drive 300. For example, data stored in a cache (not shown) may be sufficient to operate a device containing disc drive 300 until disc drive 300 releases disc 304 from actuator coils 308. In addition, the high-precision of the drive manufacturing may allow for creation of mechanical limiters that would limit the deflection of components to prevent mechanical yielding or damage.

Figure 8C:
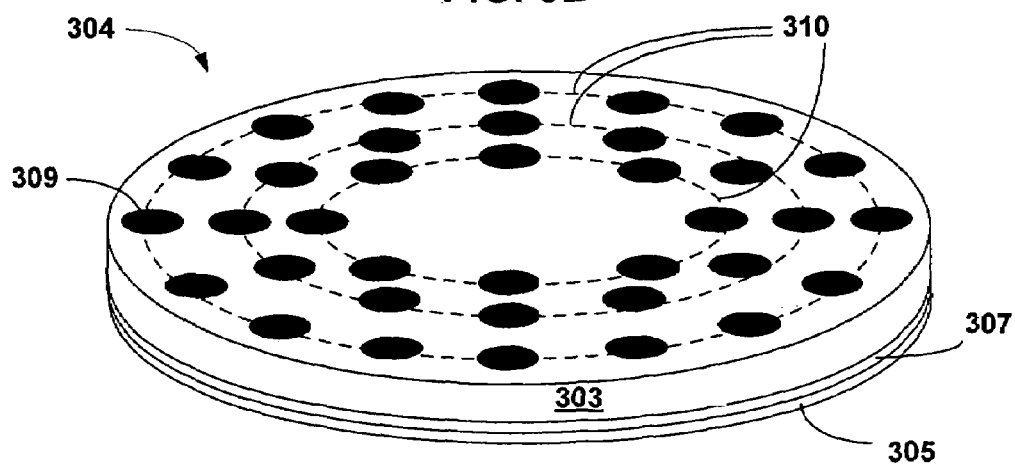

FIG. 8C illustrates an exemplary arrangement of permanent magnets 309 in disc 304. As shown in FIG. 8C, permanent magnets 309 are distributed among three concentric circles 310. Permanent magnets 309 are equally spaced within each of concentric circles 310 such that the mass of disc 304 is symmetric about its center.

Figure 9:
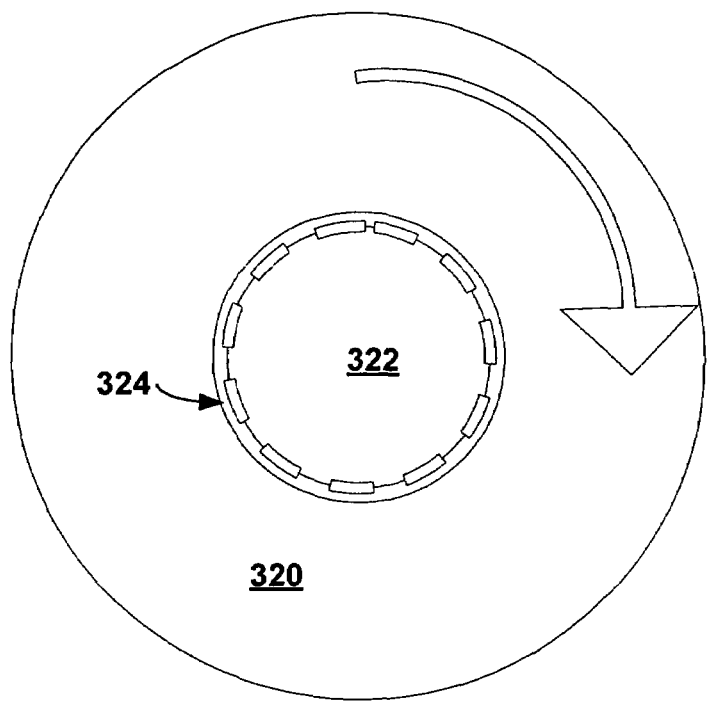
FIG. 9 illustrates a recordable disc centered on a hub including fluid bearings.

FIGS. 9-12 illustrate recordable disc axially constrained by fluid bearings. In different embodiments, fluid bearings may operate using air, other gasses or liquids. In FIG. 9 recordable disc 320 is centered on hub 322. Axial bearing 324 includes fluid bearing features to form a controlled, non-contact pressurization when disc 320 rotates. For example Axial bearing 324 may comprise subtle or pronounced "fin" or "step" type structures to create a controlled fluid pressurization gap for a spinning disc. For example, axial bearing 324 may include grooved fluid dynamic thrust gas bearings.

Figure 10:
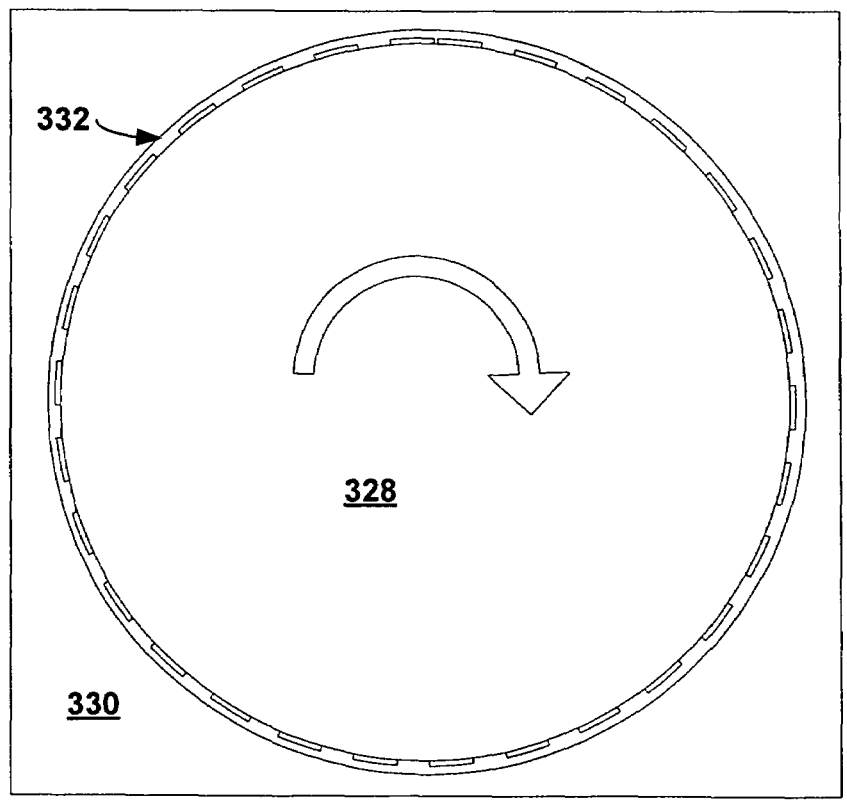
FIG. 10 illustrates a recordable disc constrained by ring of fluid bearings at the outer diameter of the recordable disc.

FIG. 10 illustrates recordable disc 328 constrained by ring of fluid bearings 332 at the outer diameter of recordable disc 328. FIG. 10 is similarly to FIG. 9 except that it does not include a center hub utilizing outer fluid bearing features for radial support. Instead recordable disc 328 is constrained by fluid bearings 332 at its outer diameter. Fluid bearings 332 form a boundary layer that interact with base 330 to center disc 328.

Figure 11:
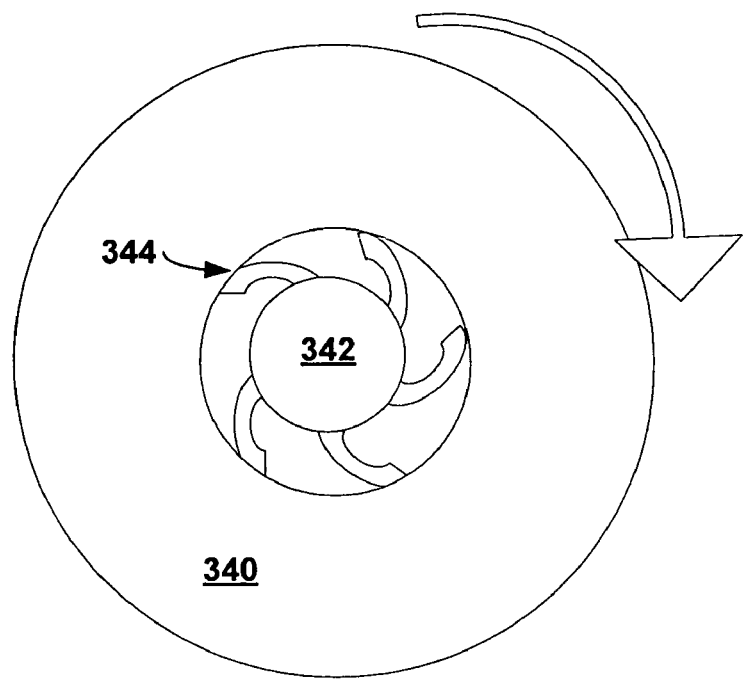
FIG. 11 illustrates a recordable disc centered on a hub including centering fingers with fluid bearings.

FIG. 11 illustrates recordable disc 340 centered on hub 342 including centering fingers 344 with textured fluid bearing surfaces. FIG. 11 includes a variation on the center hub design of FIG. 14. Center hub 342 includes "fingers" 344, which have textured fluid bearing surfaces at contact points with disc 340. Fingers 344 allow for adjustment, e.g., due to shocks or defects.

Figure 12:
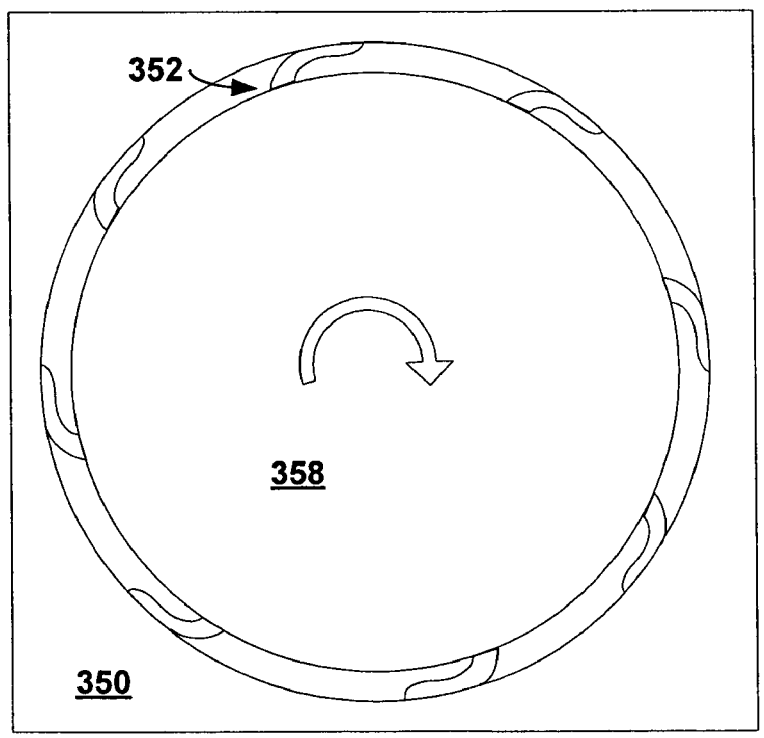
FIG. 12 illustrates a recordable disc constrained by ring of centering fingers with fluid bearings at the outer diameter of the recordable disc.

FIG. 12 illustrates recordable disc 358 constrained by a ring of centering fingers 352 with fluid bearings at the outer diameter of recordable disc 358. FIG. 12 shows fingers 352 at the outer diameter of disc 358. Fingers 352 are fixed to base 350 and include fluid bearings at the contact points with disc 358. Fingers 352 provide radial support and allow for adjustment, e.g., due to shocks or defects.

Figure 13A:
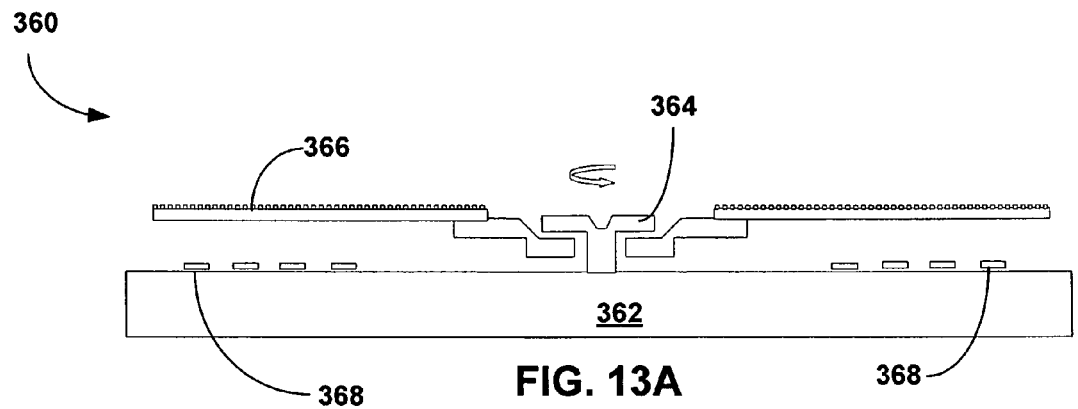
FIGS. 13A-B illustrate a side view of a recordable compliant disc mounted on a center hub.
Figure 13B:
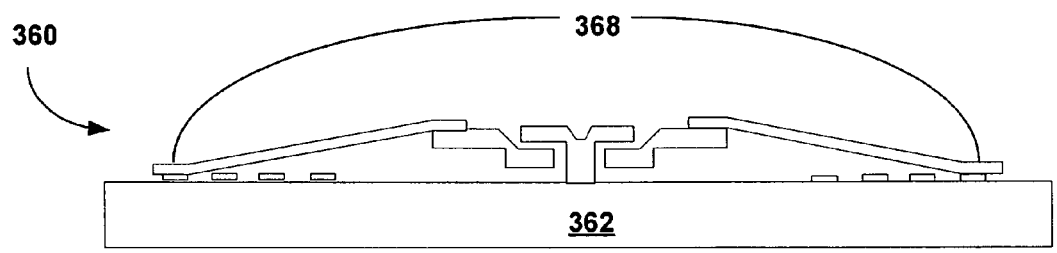

FIGS. 13A-B are cross-section illustrations of disc dive 360 including actuators 368 integrated within base 362. Disc drive 360 is also shown with recordable disc 366 on center hub 364. Disc drive 360 includes additional features not shown in FIG. 13. For example, disc drive 360 includes a head mounted to an actuator (not shown) to read and/or write data to recordable disc 366. In different embodiments, recordable disc 366 can be either a flexible or rigid recordable disc. In embodiments where recordable disc 366 is flexible, centripetal force may in whole or in part contribute to causing disc 366 to be substantially flat during operation of disc drive 360.

FIG. 13A shows disc dive 360 while in operation. Actuators 368 provide electrostatic and/or electromagnetic forces on recordable disc 366 to rotate flexible recordable disc 366 about center hub 364, an axial bearing for recordable disc 366.

If disc 366 is sufficiently compliant, when disc drive 360 is not operating, actuators 368 or a subset thereof may secure disc to base 362, e.g., the position shown in FIG. 13B. This may protect the media surface of disc 366 to increase reliability of disc drive 360. Furthermore, in the event of a severe shock, disc drive 360 may automatically secure disc 366 to base 362 in order to prevent damage to the media surface. Securing disc 366 to base 362 may temporarily interruption read/write processes of disc drive 360. However, the operation of disc drive 360 may immediately be resumed following a severe shock. The interruption resulting from a shock may not be noticeable to a user of disc drive 360. For example, data stored in a cache (not shown) may be sufficient to operate a device containing disc drive 360 until disc drive 360 releases disc 366 from actuators 368. In addition, in embodiments where recordable disc 366 is flexible, recordable disc 366 can provide a compliant surface while a head/suspension/actuator (not shown in FIGS. 13A-B) remains rigid. This is in contrast to a conventional disc drive designs that utilize a rigidly supported recordable disc and a compliant gimbal suspension structure.

Center hub 364 may include textured fluid bearing surfaces to create a boundary layer between the rotatable portions of center hub 364 and the fixed spindle of center hub 364 during operation of disc drive 360. During operation, disc 366 is constrained not only by center hub 364, but also by boundary layers of fluid, e.g., air, around the surfaces of disc 366. Furthermore, centripetal force may keep disc 366 substantially flat during operation. Base 362 may include fluid bearing surfaces to increase fluid pressure within boundary layers surrounding disc 366 to stabilize disc 366 as it rotates. At very high speeds, boundary layers fluid pressure surrounding disc 366 may prevent disc from contacting base 362, even when disc 360 is subjected to a substantial shock. For example, disc 366 may achieve speeds of 100,000 rpm or greater.

Figure 14:
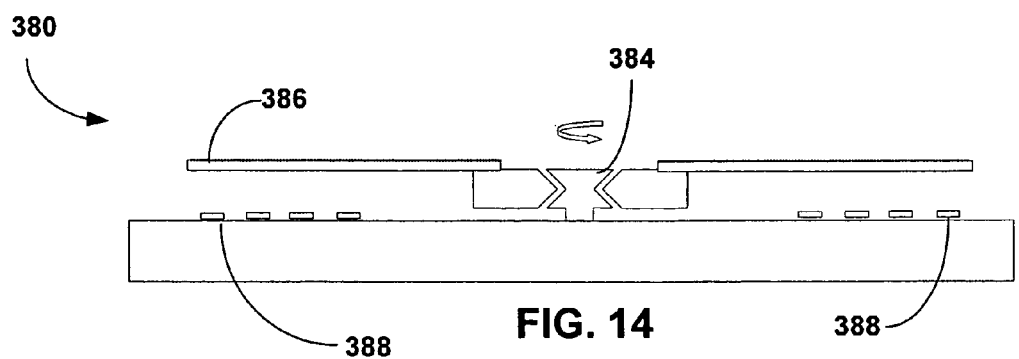
FIG. 14 shows a recordable disc mounted on a center hub designed to provide radial and axial thrust bearing support.

FIG. 14 shows disc drive 380 including recordable disc 386 mounted on center hub 384, an axial bearing for recordable disc 366. Center hub 384 is designed to provide radial and axial thrust bearing support for recordable disc 386 because its surface is at an angle relative to the rotational plane of disc 386. A mechanical bearing that utilizes a small gap between stationary hub 384 and disc 386 during operation of disc drive 380. For example, this gap may be fabricated with a thin sacrificial film. A protective coating over the interface of hub 386 and disc 386 may reduce wear, provide mechanical robustness or even lubrication. For example, a protective coating could be applied as a thin film in the regular process flow, or could be applied towards the back end of the processing.

Axial bearing structures other than those shown in FIGS. 13 and 14 are also possible. For example, an additional bearing element may be used to prevent static friction and resulting wear during very low speed operation as seen at start and prior to stop. For example, an INCABLOC™ type bearing element may be used. An additional bearing element may define a wider range of axial rotor location than the primary bearing elements that are effective close to nominal speed.

Figure 15A:
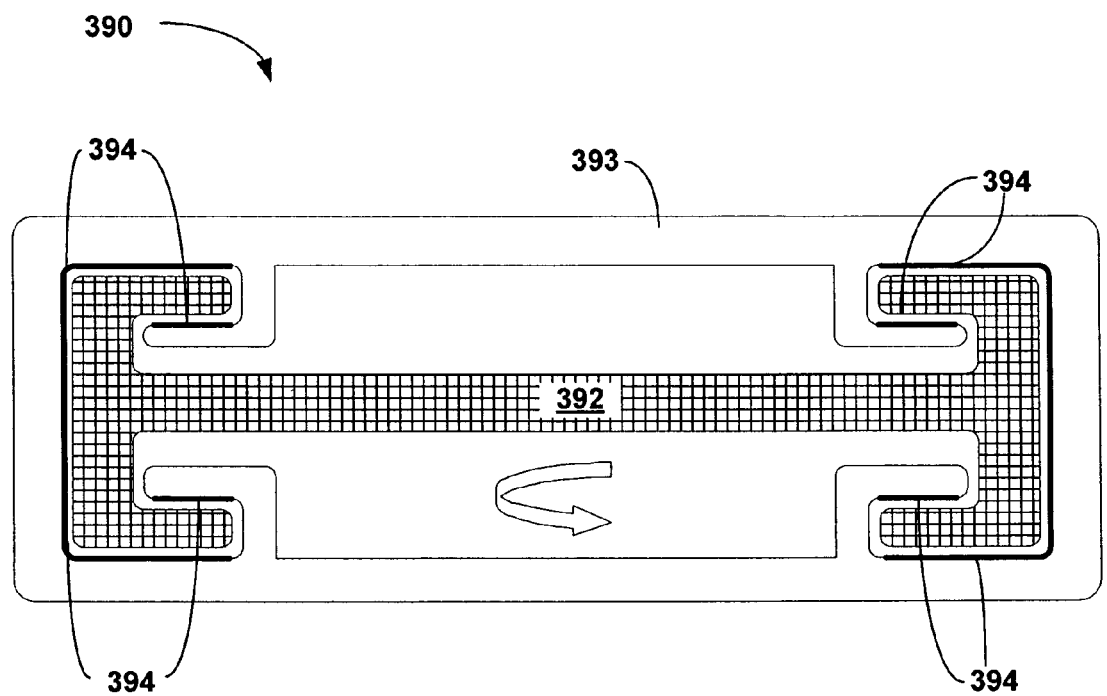
FIG. 15A illustrates a recordable disc and disc drive housing including a multi-level support bearing with textured fluid bearing surfaces between the disc and disc drive housing.

FIG. 15A illustrates disc drive 390 including recordable disc 392 and housing 393. Housing 393 includes multi-level support fluid bearings 394. Multi-level support fluid bearings 394 may be fabricated using multiple layers and MEMS processes, including wafer bonding, etc. Multi-level support fluid bearings 394 may provide stability to recordable disc 392 by having a large surface area and through multi-directional support of recordable disc 392.

Figure 15B:
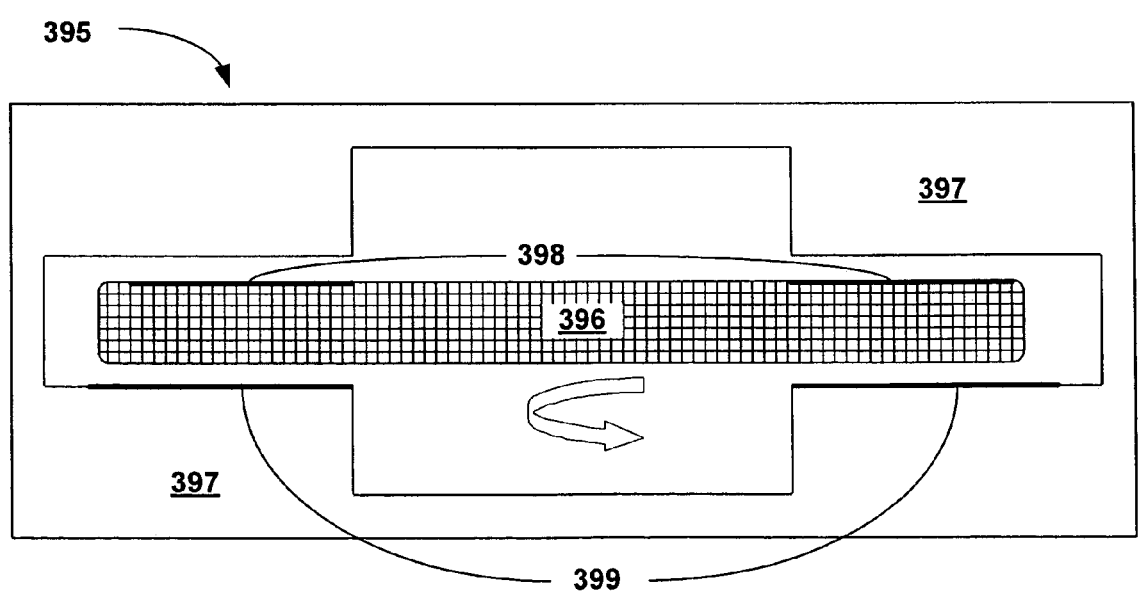
FIG. 15B illustrates a single-level recordable disc and disc drive housing with textured fluid bearing surfaces between the disc and disc drive housing.

FIG. 15B illustrates disc drive 395 including recordable disc 396 and housing 397. Disc drive 395 includes fluid bearings 398 and 399. As shown in FIG. 15B, fluid bearings 398 include a textured fluid bearing surface on recordable disc 396, while fluid bearings 399 include a textured fluid bearing surface on housing 397. Other embodiments may include fluid bearings with two opposing textured fluid bearing surfaces forming a single fluid bearing.

Figure 16:
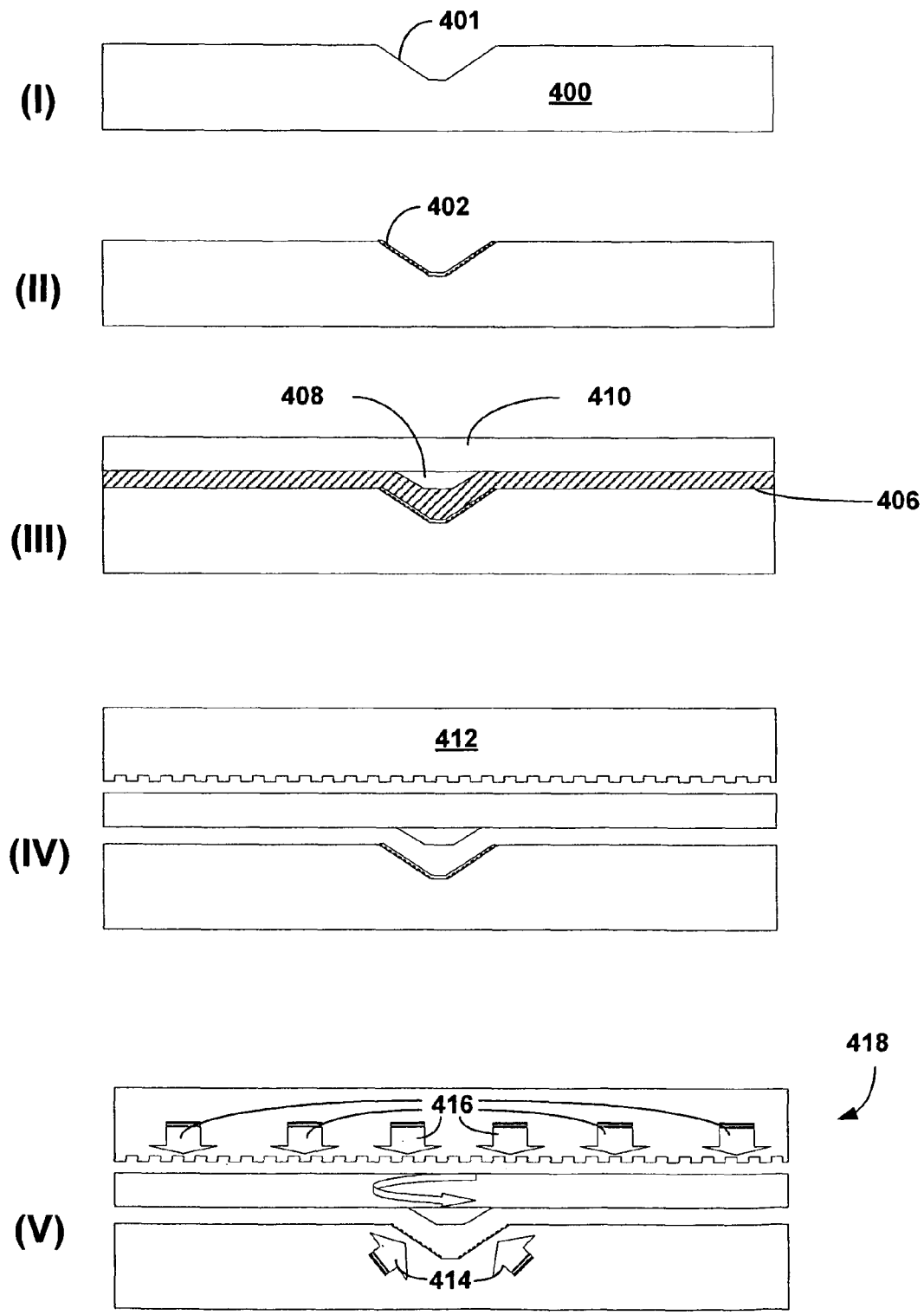
FIG. 16 illustrates an electromagnetically levitating rotary bearing and exemplary micromachine process steps for its manufacture.

FIG. 16 illustrates MEMS process steps I-V for the manufacture of levitating rotary bearing 418. In step I, base wafer 400 is etched with cavity 401. For example, base wafer may comprise silicon. In step II, electromagnet 402 patterned on top of cavity 401. For example, electromagnet 402 may include coils and magnetic material.

Step III requires multiple MEMS processes. First, sacrificial layer 406 is deposited with a constant thickness. Second, magnetic material 408 is deposited into what remains of cavity 401. Third, disc material 410 is deposited. For example, disc material 410 may be a spin-on-glass.

Step IV, also requires multiple MEMS processes. First, a sacrificial layer (not shown) is deposited on top of disc material 410. The sacrificial layer may form fluid bearing geometry. Second, cover material 412 is deposited on the sacrificial layer. For example, cover material 412 may comprise the same substance as base wafer 400. Cover material 412 takes the shape of the sacrificial layer, including fluid bearing features. Third, the sacrificial layer is etched along with sacrificial layer 406, releasing disc material 410.

A Step V shows levitating rotary bearing 418 in operation. Electromagnet 402 creates forces 414 to levitate and axially constrain disc material 410. An actuation mechanism (not shown) rotates disc material 410. For example, an electrostatic or electromagnetic actuation mechanism may be used. Fluid bearings on cover material 412 create forces 416 to create a constant fly height. Because forces 416 oppose forces 414, disc material 410 is constrained axially and vertically. In this manner, rotary bearing 418 does not require a central hub or fluid bearing features at the outer diameter of disc material 410.

Figure 17:
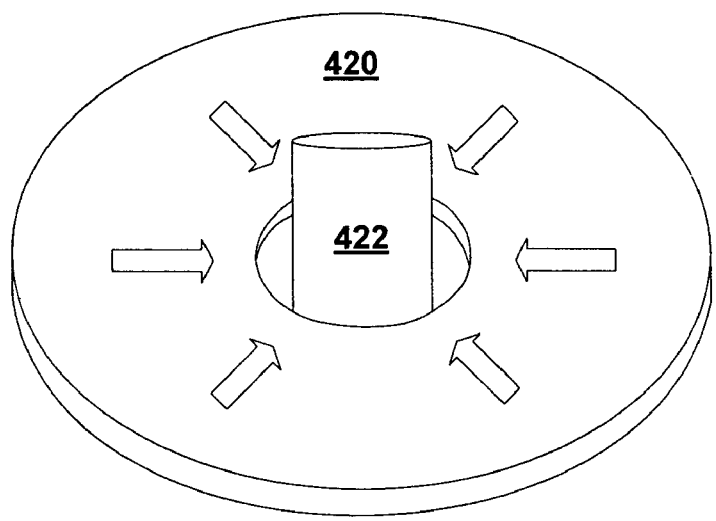
FIG. 17 illustrates an annular chuck mechanism with an adjustable internal diameter.

FIG. 17 illustrates annular chuck mechanism 420 with an adjustable internal diameter. Chuck mechanism 420 provides adjustable geometry to reduce or eliminate the gap between hub 422 and chuck mechanism 420. For example, chuck mechanism 420 may comprise piezoelectric, magnetostrictive, and/or thermal actuation structure. Chuck mechanism 420 couples to a recordable disc (not shown) and combines with hub 422 to form a bearing for the disc. Minimizing any gaps between hub 422 and chuck mechanism 420 increases the precision of rotational movement of the recordable disc. Precise rotational movement is required to increase track density on a magnetic media for example. Chuck mechanism 420 provides process robustness and allow greater tolerances manufactured gaps between hub 422 and chuck mechanism 420. Even though there may be a large gap between hub 422 and chuck mechanism 420 after fabrication, the gap can be controlled by shrinking chuck mechanism 420. Chuck mechanism 420 may also be used to minimize effects of shock by "locking down" or grabbing onto hub 422 during a sensed shock or acceleration event.

Figure 18:
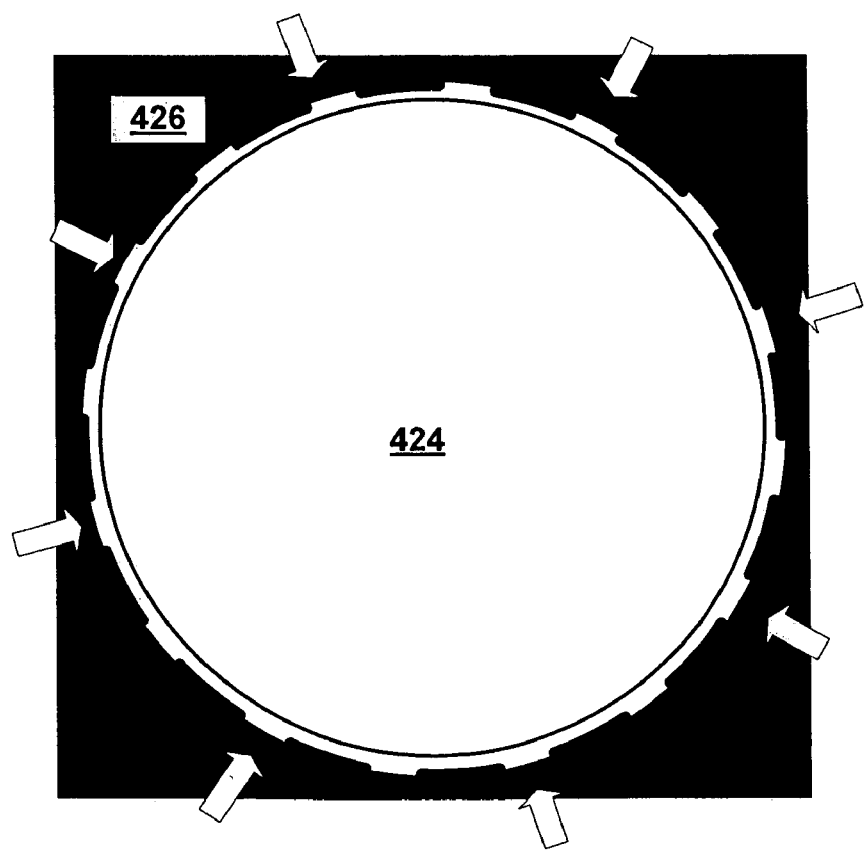
FIG. 18 illustrates a recordable disc and adjustable outer diameter fluid bearing.

FIG. 18 illustrates recordable disc 424 and adjustable outer diameter fluid bearing 426. Adjustable outer diameter fluid bearing 426 provides adjustable geometry to reduce or eliminate the gap between recordable disc 424 and adjustable outer diameter fluid bearing 426. For example, adjustable outer diameter fluid bearing 426 may comprise piezoelectric, magnetostrictive, and/or thermal actuation structure. Adjustable outer diameter fluid bearing 426 minimizes the gap at the outer diameter of disc 424. Adjustable outer diameter fluid bearing 426 may provide many of the same advantages as chuck mechanism 420 shown in FIG. 17. Adjustable outer diameter fluid bearing 426 improves the precision of rotational movement of disc 424 by adjusting the outside diameter radial textured fluid bearing surface position relative to disc 424. In this manner, adjustable outer diameter fluid bearing 426 optimize gaps between the textured fluid bearing surface and disc 424. Adjustable outer diameter fluid bearing 426 may also be used to minimize effects of shock by "locking down" or grabbing onto disc 424 during a sensed shock or acceleration event.

Figure 19A:
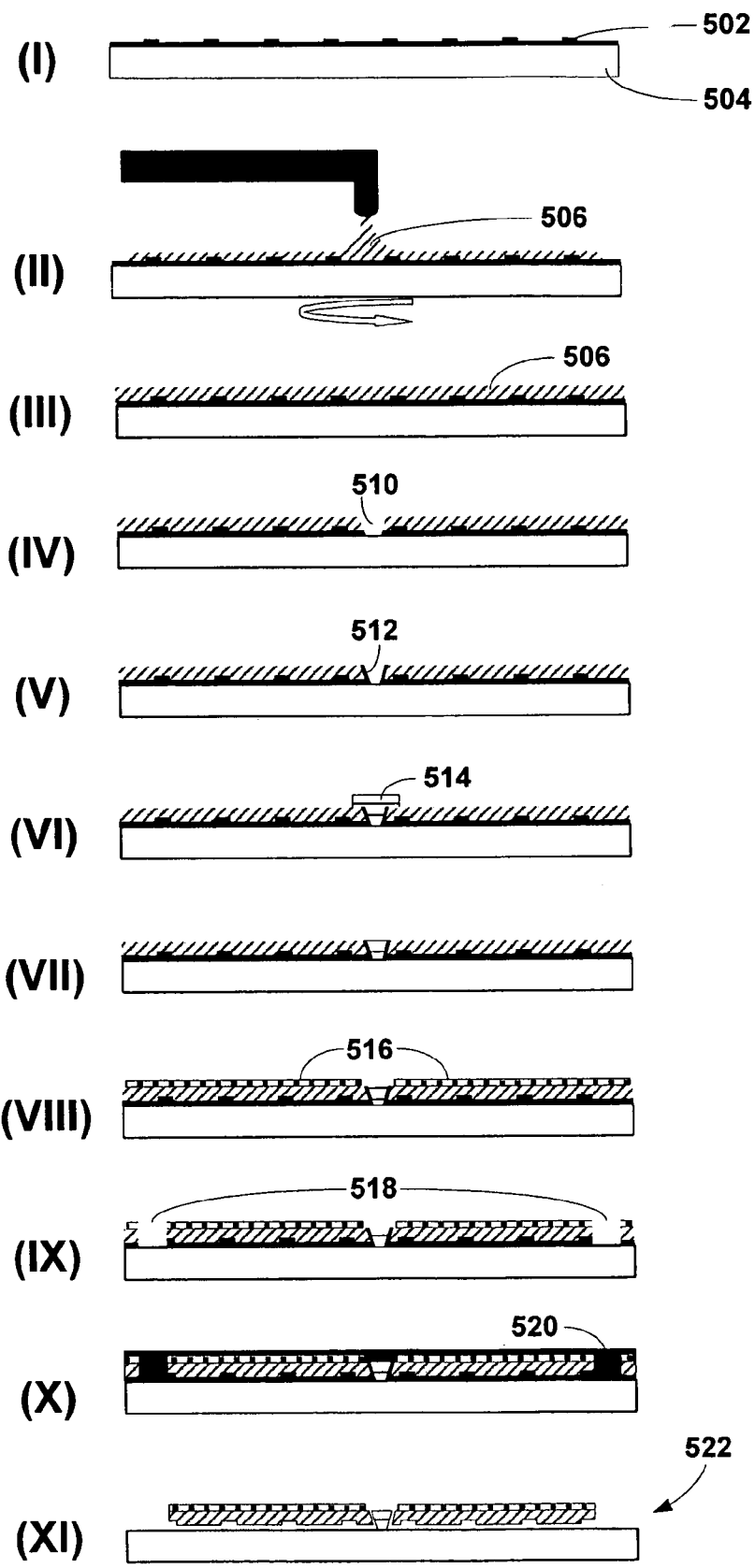
FIGS. 19A-C illustrate exemplary process steps to produce a MEMS disc drive having a center hub to constrain the disc as it rotates.
Figure 19B:
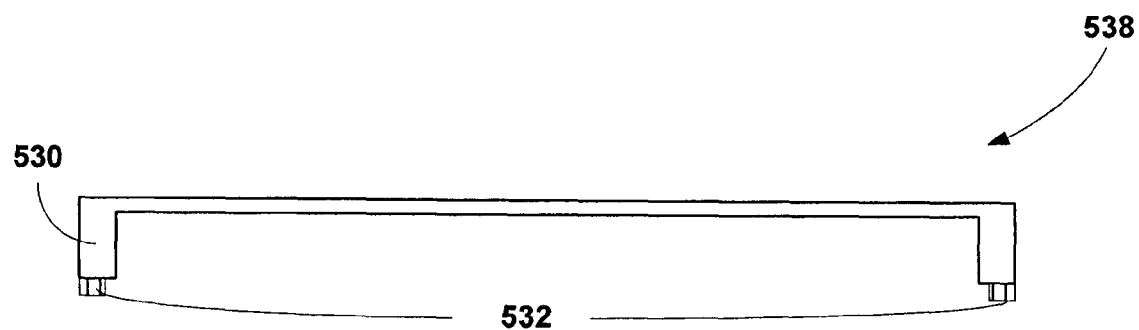
Figure 19C:
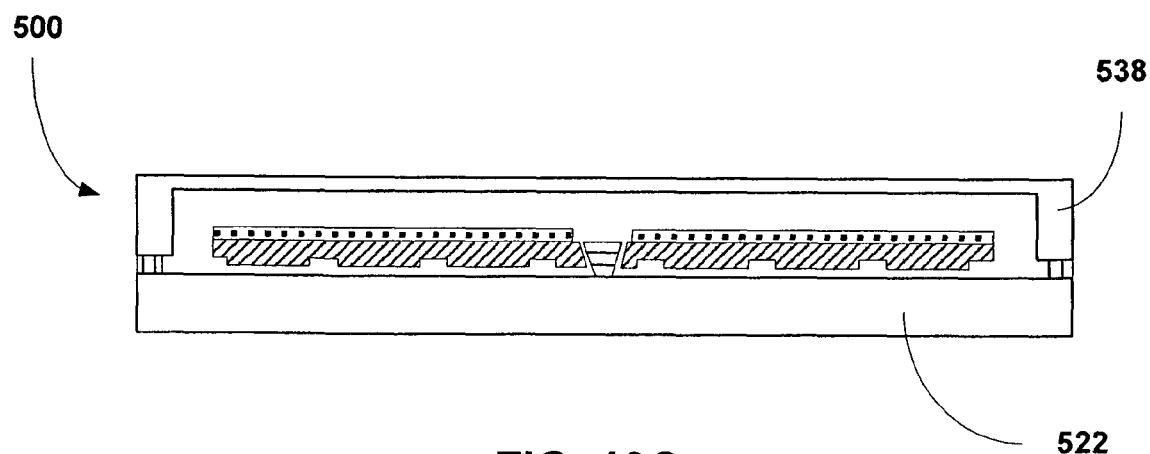

FIGS. 19A-C illustrate exemplary process steps to produce MEMS disc drive 500 having a center hub to constrain the disc as it rotates. FIG. 19A shows MEMS process steps I-XI performed on a first wafer substrate 504 to create integrated base and disc 522. FIG. 19B shows cover 538 created on a second wafer substrate 530. FIG. 19C shows cover 538 bonded to integrated base and disc 522 forming disc drive 500. One or more manufacturing processes may be required between each step shown in FIGS. 19A-C.

As shown in FIG. 19A, integrated base and disc 522 is produced from a single wafer using a series of MEMS processes. Steps I-III form the basic disc geometry of integrated base and disc 522. In step I patterned sacrificial layer 502 is molded to substrate 504. For example, patterned sacrificial layer 502 may be $SiO_2$. Patterned sacrificial layer 502 may be shaped to create fluid bearings for the disc of integrated base and disc 522. In step II, disc material 506 is deposited on top of patterned sacrificial layer 502. For example, disc material 506 may be spun-on glass. In step III, disc material 506 is planarized. A deposition step (not shown) may be used to add a shield layer and/or media layer, e.g., a magnetic media layer, to disc material 506.

Steps IV-VII form the hub of integrated base and disc 522. The hub constrains the disc as it rotates. In step IV hub geometry 510 is etched into disc material 506 and sacrificial layer 502. For example, hub geometry 510 may contain fluid bearing sliders to increase boundary layer fluid pressure of the disc as disc drive 500 operates. In step V, hub sacrificial layer 512 is deposited and patterned. For example, sacrificial layer 512 may be the same material as patterned sacrificial layer 502, e.g., $SiO_2$. In step VI, hub material 514 is deposited. For example, hub material 514 may be polysilicon. For step VII, hub material 514 is planarized to complete the shape of the hub of integrated base and disc 522.

Steps VIII and IX form add the media surface to the disc of integrated base and disc 522 and finish the shape of the disc. In step VIII, media layer 516 is deposited and patterned. For example, media layer 516 may be a thin film magnetic media. For step IX, disc geometry is patterned by etching gap 518 through media layer 516, disc material 506 and into patterned sacrificial layer 502.

Steps X and XI complete integrated base and disc 522. In step X, sacrificial layer 520 is deposited and patterned as a protective layer in order to protect integrated base and disc 522 during back end processing steps, such as singulation of separate components. For example, sacrificial layer 520 may be the same material as sacrificial layer 512 and patterned sacrificial layer 502, e.g., $SiO_2$. In step XI, sacrificial layer 520, sacrificial layer 512 and patterned sacrificial layer 502 are etched. For example, etching may be performed using anhydrous HF and alcohol vapor etch. After etching disc material 506 is released from substrate 504, and the disc may rotate freely about the hub.

FIG. 19B shows cover 538 created on a second wafer substrate 530. For example, substrate 530 may comprise silicon. Cover 538 may be created using bulk micromachining processes. Cover 538 also includes patterned bonding material 532. Cover 538 may additionally include an integrated permanent magnet to interact with a voice coil of an actuator assembly and/or an environmental control component.

FIG. 19C shows cover 538 bonded to integrated base and disc 522 forming disc drive 500. Cover 538 is held to the base of integrated base and disc 522 with bonding material 532. Bonding material 532 creates a hermetic seal to contain fluids within disc drive 500. For example fluids contained within disc drive 500 may be helium or other gaseous or liquid fluids.

Processes other than those described, may also be used in the manufacture of disc drive 500. For example, burnishing could be used to correct for small defects. Also, disc drive 500 may include additional features not shown in FIGS. 19A-C. For example a protective coating may be added to hub 510 or elsewhere for lubrication or mechanical robustness. For example, disc drive 500 also includes an actuator assembly and may also include actuator electrodes integrated within its base and permanent magnets integrate within its disc. For example, disc drive 500 may include an integrated sensor, e.g., a thermometer, gyroscope or accelerometer. Disc drive 500 may also include an integrated environmental control component, e.g., a resistive heating element and/or a Peltier cooling system. Disc drive 500 may also include control circuitry integrated within its housing. Each of these features may be manufactured using MEMS techniques as part of the first wafer, the second wafer or one or more additional wafer(s).

The techniques described with respect to FIG. 19 for depositing the disc structure allow integration of disc and disc actuator including features such as electrodes or magnets. Alternatively, a disc may microfabricated out of a bulk material, e.g., silicon and used with other conventionally manufactured disc drive components.

Figure 20A:
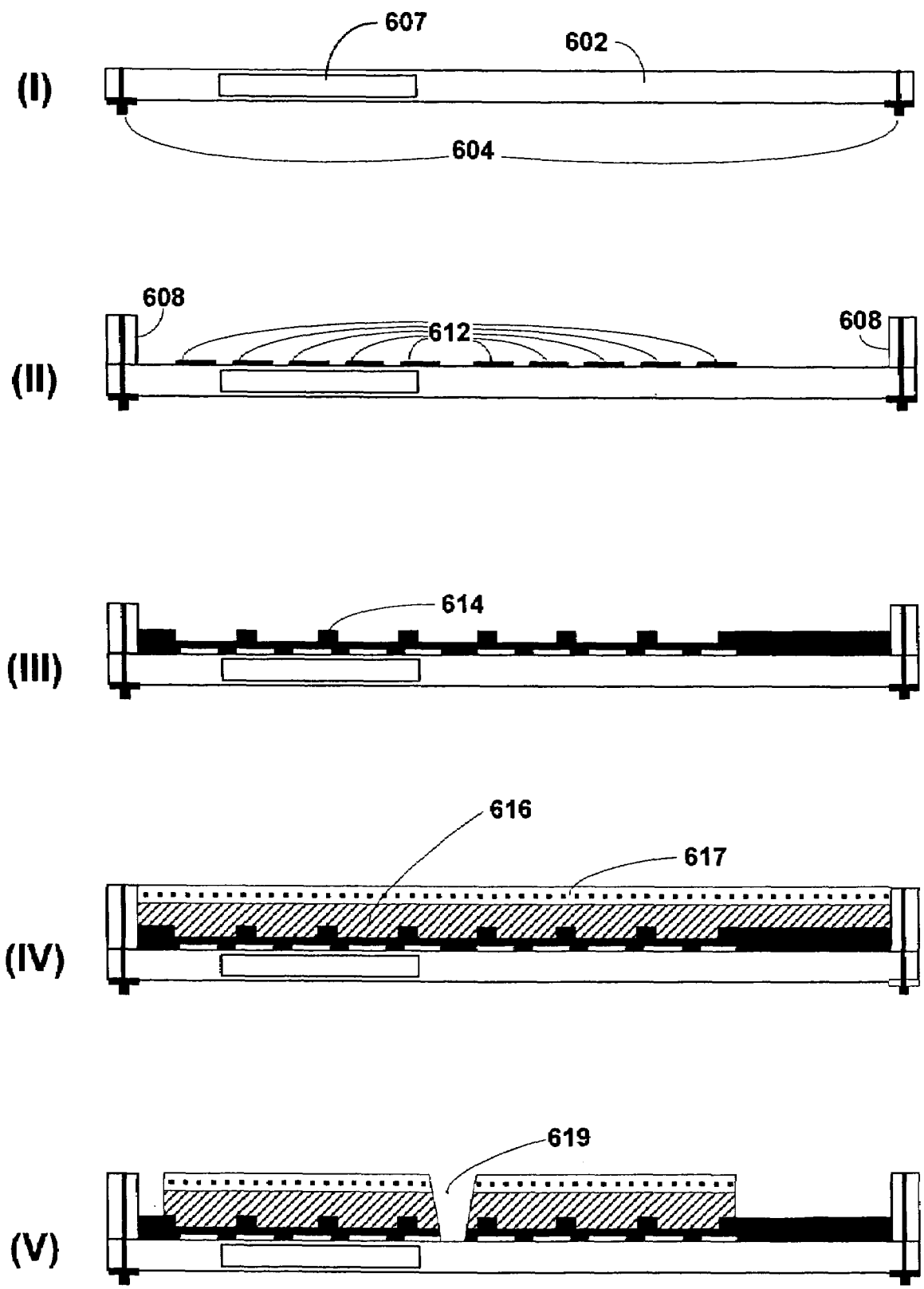
FIGS. 20A-C illustrate exemplary process steps to produce a disc drive including a center hub on a single wafer substrate.
Figure 20B:
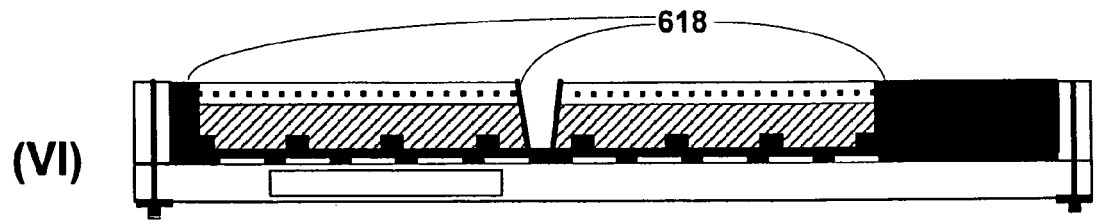
Figure 20B:
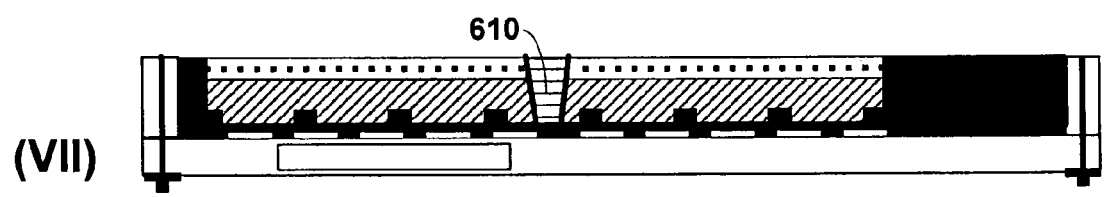
Figure 20B:
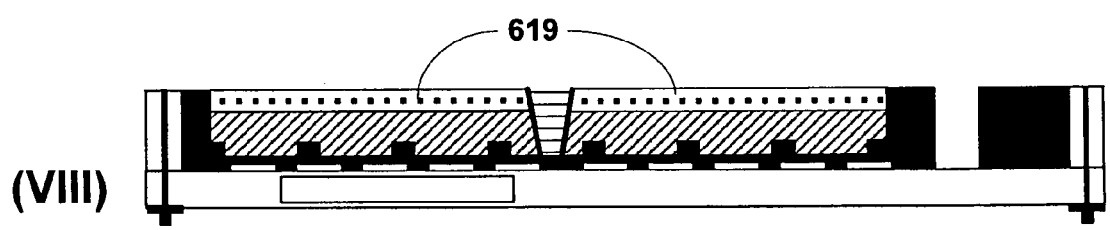
Figure 20B:
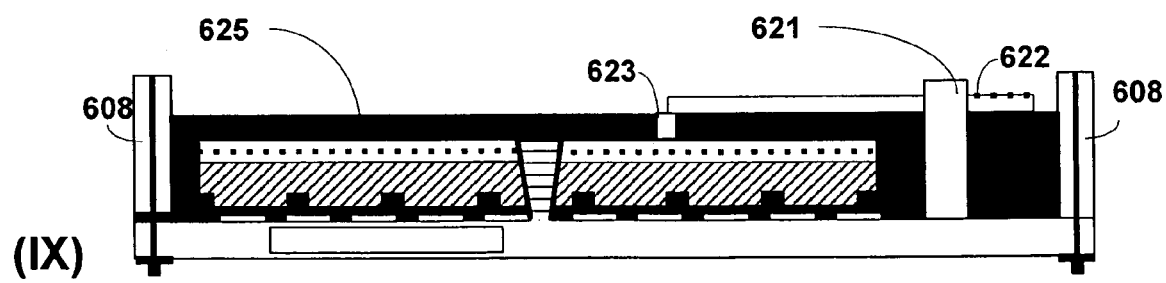
Figure 20C:
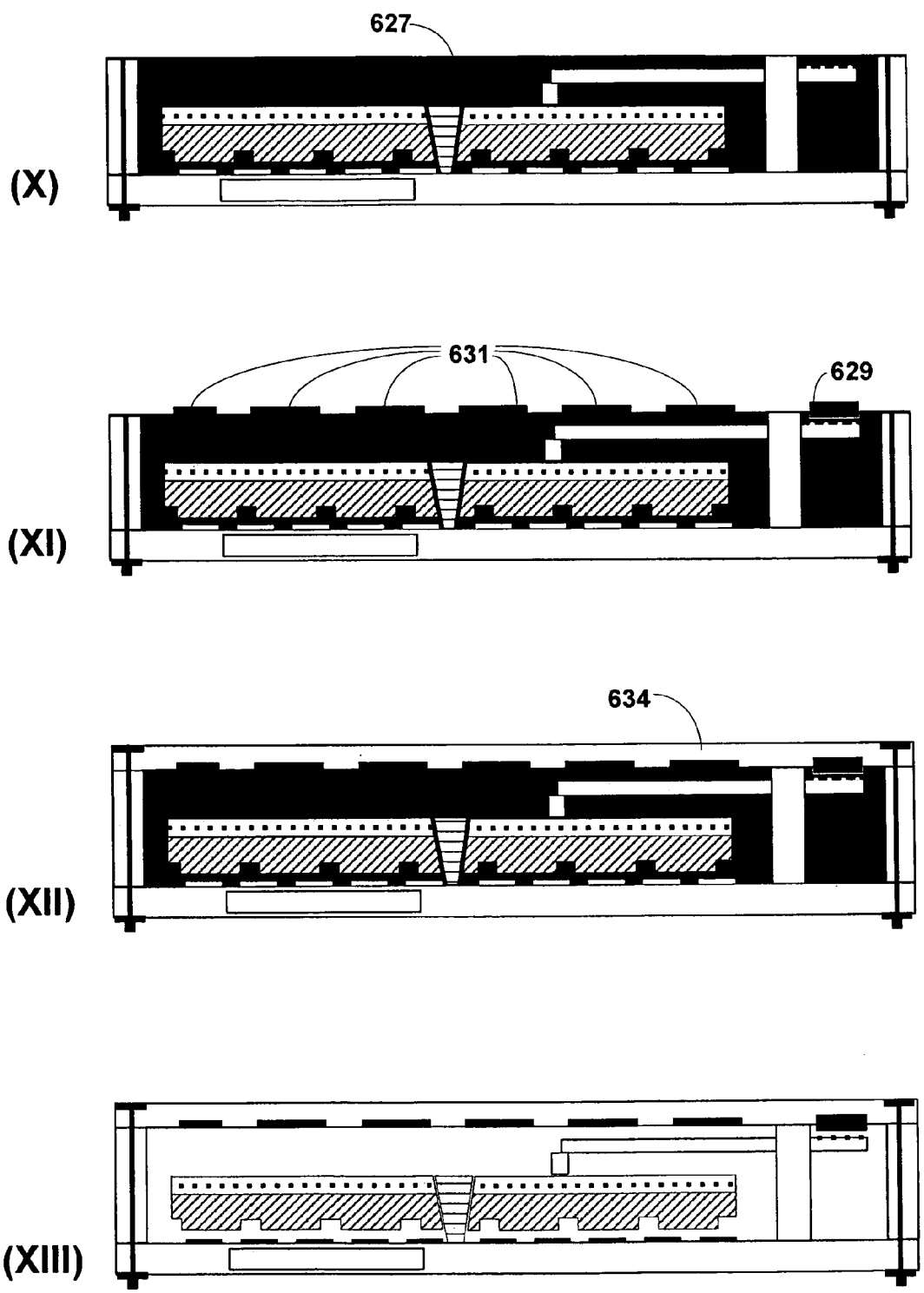

FIGS. 20A-C illustrate disc drive 600 including a center hub formed from single wafer substrate 602 and micromachine process steps for its manufacture. FIGS. 20A-C illustrate steps I-XIII, each step representing a point in the manufacturing process of disc drive 600. One or more manufacturing processes may be required between each step shown in FIGS. 20A-C.

Steps I and II, shown in FIG. 20A, produce a base and disc actuation component for disc drive 600. In step I, wafer vias 604 and sensor 607 are patterned in wafer substrate 602. In this manner, wafer vias 604 and sensor 607 are integrated within the housing of disc drive 600. For example wafer substrate 602 may be a silicon wafer substrate. Wafer vias 604 may provide electrical connections, e.g., power and/or data signal connections, for disc drive 600. Additional electrical connection paths (not shown) may also be patterned in wafer substrate 602. Sensor 607 may be, e.g., a thermometer, gyroscope or accelerometer. In step II, actuation electrodes 612 deposited and patterned. Spacer layer 608 is also deposited and patterned in step II. For example, spacer layer 608 may comprise silicon. Spacer layer 608 is patterned to integrate vias 604 within the housing of disc drive 600.

Steps III-V, shown in FIG. 20A, produce a recordable disc of disc drive 600. In step III, sacrificial layer 614 is deposited. For example, sacrificial layer 614 may comprise germanium. Sacrificial layer 614 is shown with fluid bearing features. In step IV, first disc material layer 616 is deposited. For example, disc material layer 616 may comprise spin-on glass. After disc material layer 616 is deposited, media surface 617 is deposited on top of disc material layer 616. For example, media surface 617 may include magnetic particles. In step V, disc material layer 616 including media surface 617 is patterned and etched to form the shape of the recordable disc. The disc pattern may include textured fluid bearing surfaces.

Steps VI and VII, shown in FIG. 20B, produce center hub 610 for disc drive 600. In step VI, sacrificial layer 618 is deposited. For example, sacrificial layer 618 may consist of the same substance as sacrificial layer 614. For example, sacrificial layer 618 may comprise germanium. Sacrificial layer may include fluid bearing features (not shown) for center hub 610. In step VII, center hub 610 is deposited on top of sacrificial layer 618.

Steps VIII and IX, shown in FIG. 20B, produce actuator arm 621 for disc drive 600. In step VIII, sacrificial layer 618 is etched. In step IX, actuator arm 621 is deposited and patterned on top of sacrificial layer 618. Actuator arm 621 includes head 623 and coil 622.

The manufacturing process of disc drive 600 completes with steps X-XIII, as shown in FIG. 20C. In step X, top sacrificial layer 627 is deposited. For example, top sacrificial layer 627 may consist of the same substance as sacrificial layers 614 and 618. For example, top sacrificial layer 627 may comprise germanium. In step XI, environmental control component 631 and permanent magnet 629 are deposited and patterned. Environmental control component 631 may include one or both of a resistive heating element and/or a Peltier cooling system. When disc drive 600 is operational, coil 622 interacts with magnet 629 to actuate actuator arm 621. In other embodiments, magnet 629 maybe replaced with a coil to interact with coil 622.

In Step VII, top layer 634 is deposited and planarized. For example, top layer 634 may consist of the same material as wafer substrate 602, spacer layer 608 and center hub 610. E.g., top layer 634 may comprise silicon. In step XII, sacrificial layers 614, 618 and 627 are removed. For example, sacrificial layers 614, 618 and 627 may be removed using liquid or vapor etching techniques.

Disc drive 600 may include additional features not shown in FIGS. 20A-C. For example, disc drive 600 may contain control circuitry integrated and additional electrical connection vias integrated within its housing. Each of these features may be manufactured using MEMS techniques.

FIGS. 21 A-D illustrate exemplary process steps to produce MEMS disc drive 700 having fluid bearing sliders at the outside diameter of the disc to constrain the disc as it rotates. FIG. 21A shows cover 708 created on a first wafer substrate 702. FIG. 21B shows MEMS process steps I and II performed on a second wafer substrate 710 to create integrated base and actuator electrodes 715. FIG. 21C shows MEMS process steps I-V performed on a third wafer substrate 716 to create integrated disc and outer diameter fluid bearing 728. FIG. 21D shows MEMS process steps I-III to combine cover 708, integrated base and actuator electrodes 715 and integrated disc and outer diameter fluid bearing 728 to form disc drive 700. One or more manufacturing processes may be required between each step shown in FIGS. 21A-D.

Figure 21A:
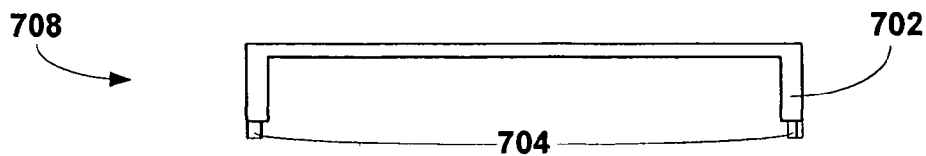
FIGS. 21A-D illustrate exemplary process steps to produce a MEMS disc drive having fluid bearing sliders at the outside diameter of the disc in lieu of a center hub to constrain the disc as it rotates.

FIG. 21A shows cover 708 created on a first wafer substrate 702. For example, substrate 702 may comprise silicon. Cover 708 may be created using bulk micromachining processes. Cover 708 also includes patterned bonding material 704. Cover 708 may additionally include an integrated permanent magnet to interact with a voice coil of an actuator assembly and/or an environmental control component.

Figure 21B:
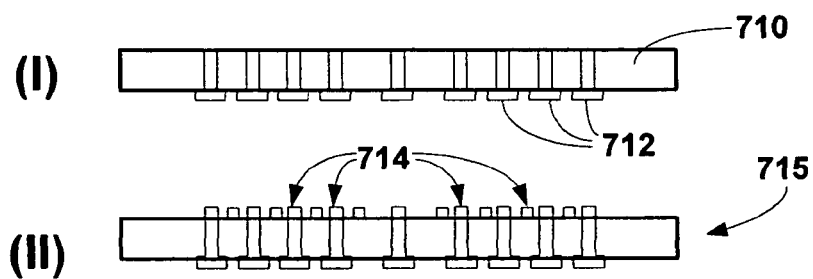

FIG. 21B shows MEMS process steps I and II performed on a second wafer substrate 710 to create integrated base and actuator electrodes 715. In step I, through-wafer electrical vias 712 are created through wafer substrate 710. For example, substrate 710 may comprise silicon. In step II, actuator electrodes 714 are deposited and patterned using actuator electrode patterns 712.

Figure 21C:
Figure 21C:
Figure 21C:
Figure 21C:
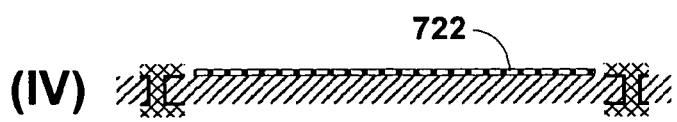
Figure 21C:
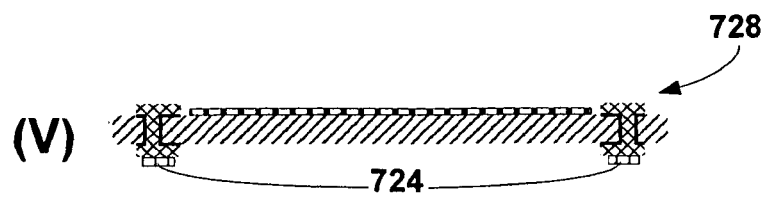

FIG. 21C shows MEMS process steps I-V performed on a third wafer substrate 716 to create integrated disc and outer diameter fluid bearing 728. In step I, sacrificial layer 718 is deposited on wafer substrate 716. For example, substrate 716 may comprise polished silicon. In step II, fluid bearing material 720 is deposited. For example, fluid bearing material 720 may be polysilicon. In step III, fluid bearing material 720 is patterned. For step IV, media layer 722 is deposited and patterned. For example, media layer 722 may be a thin film magnetic media. For step V, patterned bonding material 724 is added to the bottom of fluid bearing material 720.

Figure 21D:
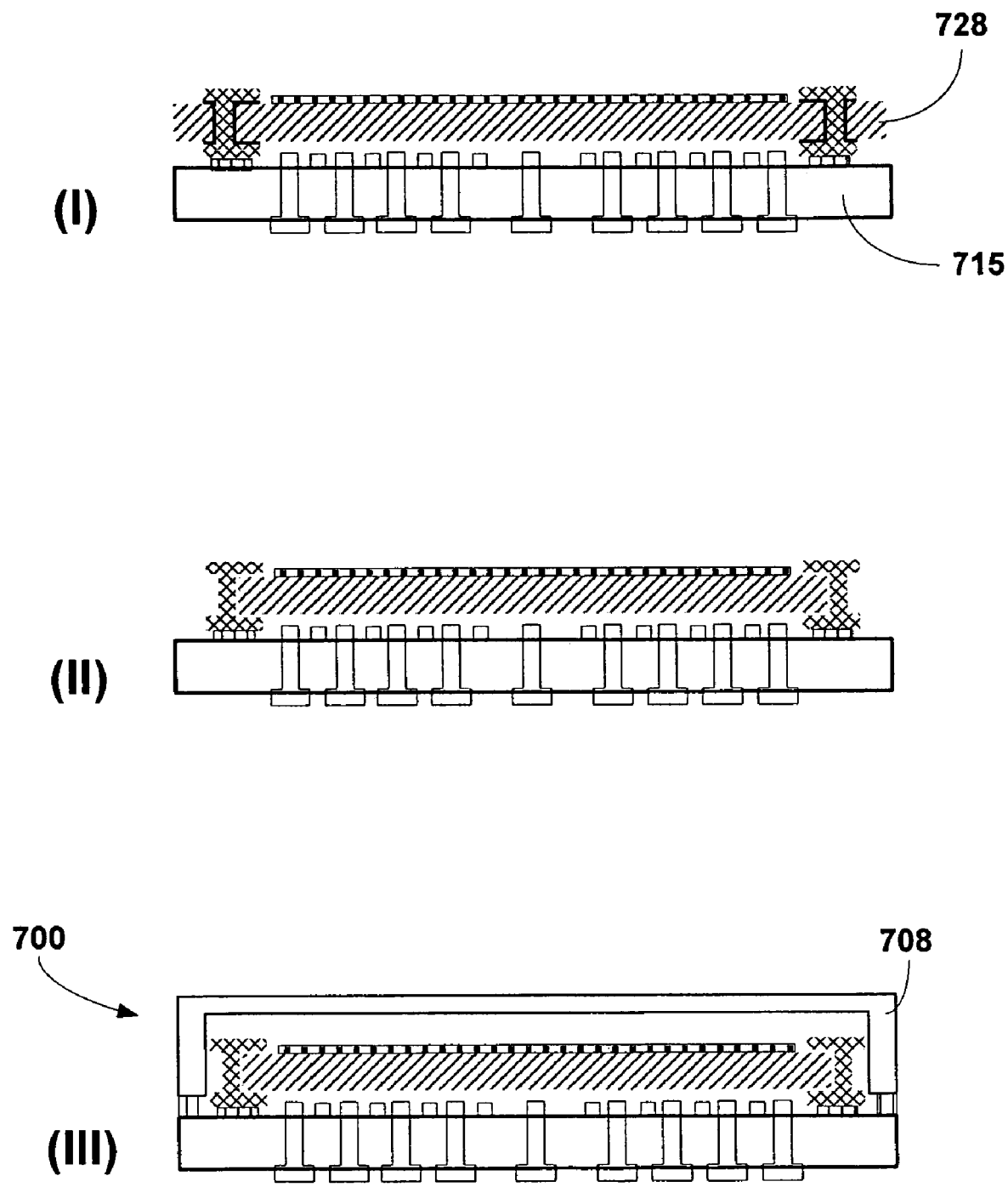

FIG. 21D shows MEMS process steps I-III to combine cover 708, integrated base and actuator electrodes 715 and integrated disc and outer diameter fluid bearing 728 to form disc drive 700. In step I, integrated disc and outer diameter fluid bearing 728 is bonded to integrated base and actuator electrodes 715. In step II, sacrificial layer 718 is etched. For example, etching may be performed using anhydrous HF and alcohol vapor etch. Step II releases the disc from the fluid bearings. In step III, cover 708 is bonded integrated base and actuator electrodes 715 with bonding material 704. Bonding material 704 creates a hermetic seal to contain fluids within disc drive 700. For example fluids contained within disc drive 700 may be helium or liquid fluids.

Disc drive 700 may include additional features not shown in FIGS. 21A-D. For example, disc drive 700 also includes an actuator assembly and may also include actuator electrodes integrated within its base and permanent magnets integrate within its disc. Disc drive 700 may include an integrated sensor, an integrated environmental control component and/or integrated control circuitry. Each of these features may be manufactured using MEMS techniques as part of the first wafer, the second wafer or additional wafer(s).

Figure 22:
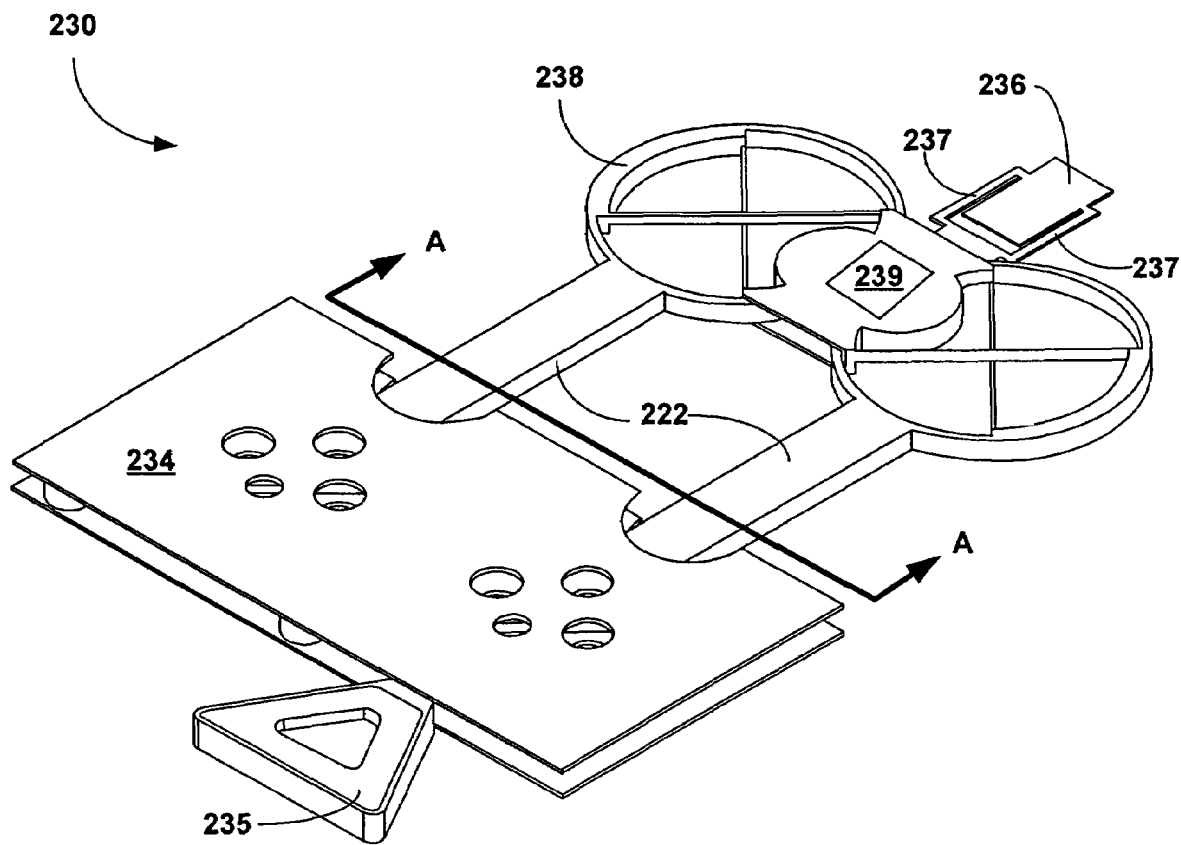
FIG. 22 illustrates a micromachined four-bar linkage actuator and suspension for a head.

FIG. 22 illustrates micromachined four-bar linkage actuator 230 that supports head 236. The suspension structure of actuator 230 includes beams 232 mounted to plates 234, flexural bearings 238 and head 236. Flexural bearings 238 provide, in combination with beams 232 and plates 234, a single degree of motion for head 236. Actuator 230 also includes head 236 and integrated electrical interconnects to drive coil 235 and head 236. Actuator 230 is an integrated head suspension, actuation coil and bearing structure.

Flexural bearings 238 have small heights as measured along their axis of rotation. For example, flexural bearings 238 may have heights of less than 5 millimeters. As other examples, flexural bearings 238 may have heights of less than 4 millimeters, of less than 3 millimeters, of less than 2 millimeters or of less than 1 millimeter. The small heights of flexural bearings 238 allow for a disc drive design with a lower Z-height.

Actuator 230 moves using coil 235 by creating an electromagnetic field to interact with a permanent magnet fixed to a housing of a disc drive. Actuator 230 also includes secondary actuation mechanism 237 integrated with head 236 to provide fine positioning of the head 236 relative to a media surface of the disc drive. Secondary actuation mechanism 237 may include, for example, one or more piezoelectric crystals.

A constant force is required to counteract the elasticity of flexural bearings 238 to hold actuator 230 in a position other than a centered position. While actuator 230 includes coil 235 for primary actuation, other embodiments may be actuated by different means. For example, thermal, electrostatic, piezoelectric and electro-active polymer actuation techniques may be used. In another example, coil 235 may be replaced with a magnet and interact with a fixed-position coil. Coil 235 may be formed by electroplating, winding or constructed as a flexible circuit and assembled onto actuator 230. For example, assembly may includes pick and place techniques.

Flexural bearings 238 may be made from multiple layers fabricated using MEMS techniques. Each of the layers in flexural bearings 238 only flexes a small portion of the total flexture of flexural bearings 238. The multiples layer allow for high flexibility in flexural bearings 238. The high flexibility of flexural bearings 238 reduces the actuation force required to move actuator 230.

Actuator 230 may be an actuator for a disc drive manufactured using MEMS and/or batch fabrication techniques. For example, actuator 230 may be fabricated from electroformed metal. MEMS processes allow a variety of complex features to be integrated as part of actuator 230. For example, integrated conductive paths may be formed within structural components of actuator 230, e.g., head 236 may be powered by and communicate through such conductive paths. Actuator 230 may also be formed as an integrated component of a disc drive, e.g., actuator 112 in FIG. 1.

Actuator 230 also includes integrated sensor 239. Integrated sensor 239 may be, e.g., a thermometer, gyroscope, position sensor, pressure sensor, or accelerometer. Integrated sensor 239 is located in a position that may be useful to detect external shocks which may result in head 236 contacting a media surface of a disc. To prevent damage to the media surface and to head 236, in the event of a shock, head 160 may be moved away from media surface 156. As another example, integrated sensor 1239 may measure ambient conditions within a disc drive of actuator 230 which may be useful to, e.g., to control head-disc spacing.

Actuator 230 has many advantages. The four-bar design of actuator 230 may minimize skew and improve the performance of head 236 by maintaining a precise distance above a media surface in a disc drive (not shown). Furthermore, coil 235 may be plated at the same time as the corresponding permanent magnet, which allows for a very small gap between the permanent magnet and coil 235. This small spacing increases the force that may be achieved to drive actuator 230, or, alternatively, a much smaller permanent magnet and/or coil. This increase in efficiency allows for a disc drive design with a reduced package height. Also actuator 230 can incorporate a head gimbal assembly with slider motion limiters with very small tolerances. For example, tolerances of less then ten micrometers are possible.

Beams 222 may be formed using electroplating and multiple pattern layers. For example, beams 222 may include an internal three-dimensional truss structure to increase strength and stiffness of beams 222, while reducing weight.

Figure 23A:
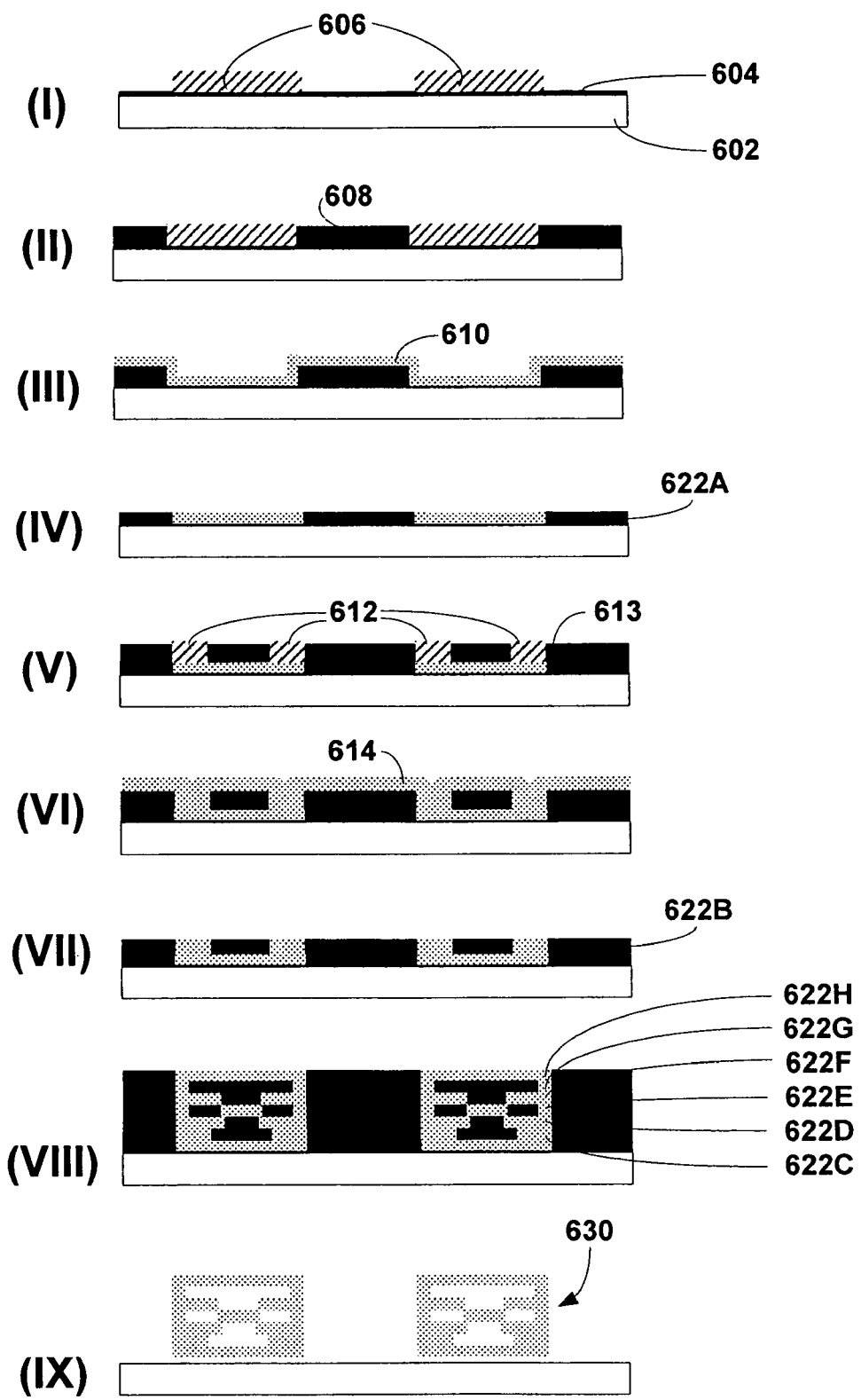
FIGS. 23A-B illustrate techniques for manufacturing disc drive head actuators using MEMS techniques.
Figure 23B:
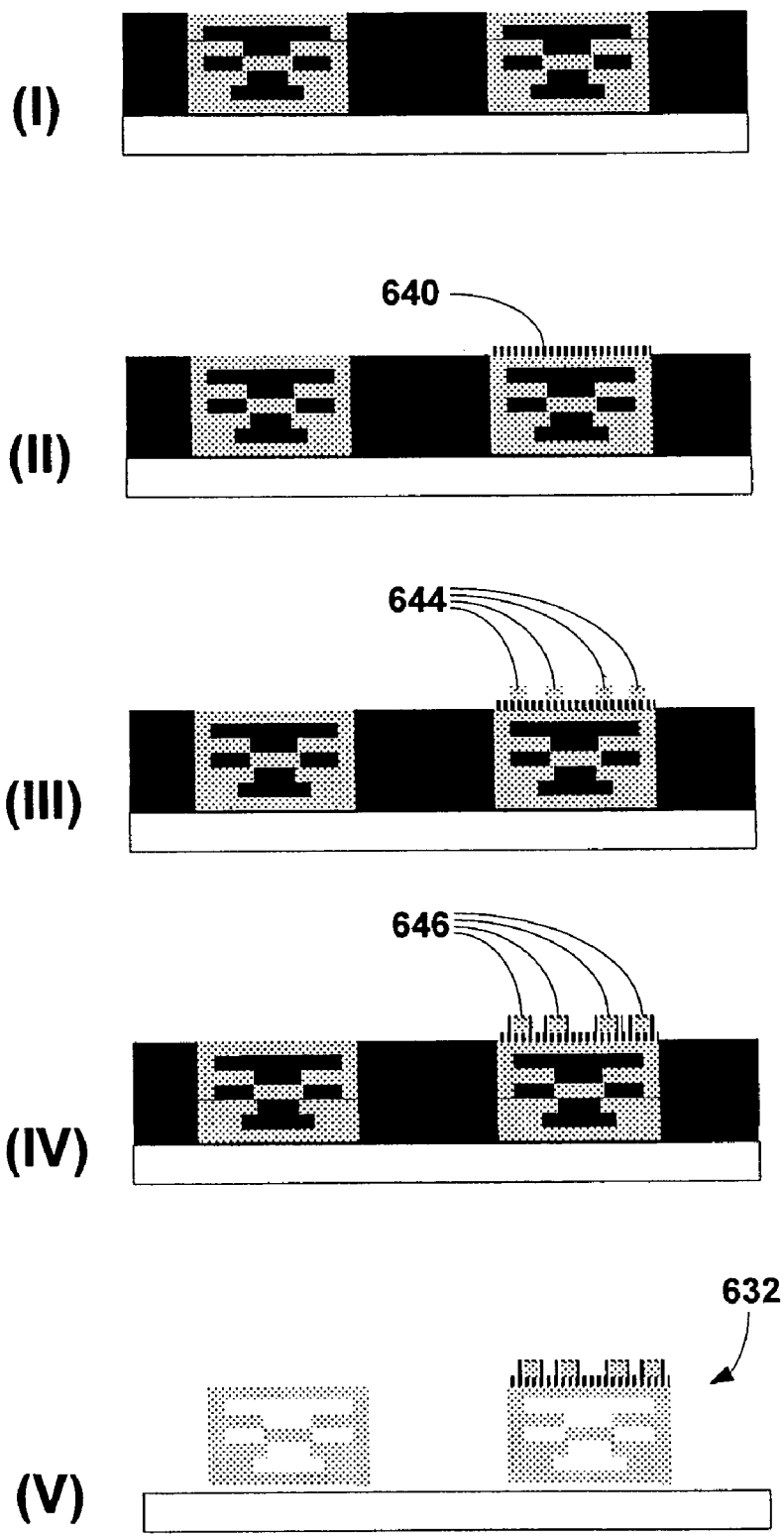

FIGS. 23A-B illustrate techniques for manufacturing disc drive head actuator 630 and disc drive head actuator 632 using MEMS techniques. Actuators 630 and 632 may be the same as actuator 230 of FIG. 22. The viewpoint for FIGS. 23A-B is shown as line A-A in FIG. 22. Actuators 630 and 632 are formed in incremental layers on substrate 602. Actuators 630 and 632 may include internal three-dimensional truss structures.

Steps I, II, III, and IV, shown in FIG. 23A, produce layer 622, which is the first layer of structure for actuator 630. In step I, plating seed layer 604 is deposited on substrate 602 and sacrificial structures 606 are patterned on plating seed layer 604. For example, plating seed layer 604 may be copper. In step II, sacrificial layer 608 is plated on top of plating seed layer 604. For example, sacrificial layer 608 may be copper. In step III, sacrificial structures 606 are removed and the first layer of structural material 610 is electroplated on top of the mold formed by sacrificial layer 608. As an example, structural material 610 may be a Nickel alloy. In step IV, layer 622A is completed by planarizing to produce the desired height of layer 622A.

The process of steps I-IV are repeated as shown in steps V-VII to produce layer 622B, which is the second layer of structure for actuator 630. In step V, sacrificial structures 612 are patterned layer 622A and sacrificial layer 613 is plated on top of sacrificial structures 612 and patterned layer 622A. For example, sacrificial layer 613 may be copper. In step VI, sacrificial structures 612 are removed and the second layer of structural material 614 is electroplated on top of the mold formed by sacrificial layer 613. As an example, structural material 613 may be a Nickel alloy. In step VII, layer 622B is completed by planarizing to produce the desired height of layer 622B.

These process steps are repeated again for each of layers 622C-622H to produce the structure shown in step VIII. In step IX, the sacrificial material including sacrificial layer 608 and sacrificial layer 613 is removed using wet or dry etching. This releases actuator 630 from substrate 602.

FIG. 23B illustrates process steps for adding an actuation coil to the structure of an actuator manufactures as shown in FIG. 23A. Step I is the same as shown in step VIII of FIG. 23A. In step II, insulative layer 640 is patterned on top of the actuator structure material. In step III, metal coil structures 644 is deposited or patterned on top of insulative layer 640. In step, IV, insulative layer 646 is patterned on top metal coil structures 644 and insulative layer 640. In step V, the sacrificial material is removed using wet or dry etching. This releases actuator 632 from substrate 602.

Actuators 630 and 632 may include additional features not shown in FIGS. 23A-B. For example, actuators 630 and 632 may be integrated with a head used to read to or write from a media disc in a disc drive. Actuators 630 and 632 may also contain integrated control circuitry integrated and additional electrical connection vias. Each of these features may be manufactured using MEMS techniques. The same steps as illustrated in FIGS. 23A-B may also be used to manufacture more than one disc drive head actuator on a common substrate.

A number of embodiments of the present invention have been described. Nevertheless, it will be understood that various modifications may be made without departing from the spirit and scope of the invention. For example, wafers used in the manufacture of MEMS disc drives may include components for more than one disc drive. Accordingly, these and other embodiments are within the scope of the following claims.

The invention claimed is:

1. A device comprising:
   a housing;
   a rotatable media disc; and
   an actuator including a head to communicate with the rotatable media disc,
   wherein the housing, the rotatable media disc, the head and the actuator are co-located on a single wafer substrate.

2. The device of claim 1, further comprising an environmental control component, wherein the environmental control component is manufactured from the single wafer substrate.

3. The device of claim 2, wherein the environmental control component is integrated within the housing.

4. The device of claim 2, wherein the environmental control component comprises a resistive wire to heat the device.

5. The device of claim 2, wherein the environmental control component comprises a Peltier cooling system.

6. The device of claim 1, further comprising actuator electrodes, wherein the actuator electrodes rotate the media disc within the data storage device.

7. The device of claim 1, wherein the media disc is a magnetic media disc.

8. The device of claim 1, wherein the housing comprises a substrate suitable for batch processing.

9. The device of claim 8, wherein the substrate is a silicon substrate.

10. The device of claim 1, further comprising a sensor integrated within the housing, wherein the sensor is manufactured from the single wafer substrate.

11. The device of claim 10, wherein the sensor is an accelerometer.

12. The device of claim 10, wherein the sensor is a thermometer.

13. The device of claim 1, wherein the housing, the rotatable media disc, the head and the actuator were manufactured from a single wafer substrate using MEMS techniques.

14. The device of claim 1, wherein the device is a small form factor disc drive.

15. The device of claim 1, wherein the device is a fully integrated device built entirely on the single wafer substrate.

16. The device of claim 1, wherein the actuator arm is part of an actuator assembly, wherein the device further comprises a motion limiter to prevent the actuator assembly from contacting the rotatable media disc, wherein the motion limiter is located at a distance of less than 25 micrometers from the actuator arm.

17. A device comprising:
a housing including a base and a cover;
a MEMS rotatable media disc;
an environmental control component; and
a MEMS actuator including a head to communicate with the rotatable media disc,
wherein the MEMS actuator is bonded to the base or the cover.

18. The device of claim 17, wherein the cover is wafer bonded to the base.

19. The disc drive of claim 17, wherein the MEMS rotatable media disc and the base combine to form an integrated disc/motor to rotate the MEMS rotatable media disc.

20. The disc drive of claim 19, wherein MEMS rotatable media disc includes magnetizable components, wherein the base includes actuation electrodes that interact with the magnetizable components to rotate the MEMS rotatable media disc.

21. The disc drive of claim 17, further comprising a seal located between the cover and the base.

22. A device comprising:
a rotatable media disc including a spin-on glass; and
a housing including a base,
wherein the rotatable media disc and the base form an integrated disc motor to rotate the rotatable media disc,
wherein the base and the rotatable media disc are manufactured as a single component from a single wafer substrate.

23. The device of claim 22, wherein the device is a small form factor disc drive.

24. The device of claim 22, further comprising an environmental control component within the housing, wherein the environmental control component is manufactured from the single wafer substrate.

25. The device of claim 22, further comprising an accelerometer integrated within the housing, wherein the accelerometer is manufactured from the single wafer substrate.

26. The device of claim 1, wherein the housing further comprises electrical vias for connecting a plurality of devices.

27. An apparatus comprising:
a single wafer substrate comprising a housing;
a media disc;
a motor; and
an actuator including a head to communicate with the media disc.

* * * * *